US006962311B1

(12) United States Patent
Sykes

(10) Patent No.: US 6,962,311 B1
(45) Date of Patent: Nov. 8, 2005

(54) PLATFORM FOR COMPUTER INPUT DEVICE

(76) Inventor: Thomas D. Sykes, 6417 Treetop Cir., Columbia, MD (US) 21045

( * ) Notice: Subject to any disclaimer, the term of this patent is extended or adjusted under 35 U.S.C. 154(b) by 1139 days.

(21) Appl. No.: 08/651,431

(22) Filed: May 22, 1996

Related U.S. Application Data

(62) Division of application No. 08/180,202, filed on Jan. 11, 1994, now abandoned.

(51) Int. Cl.[7] .................................................. B68G 5/00

(52) U.S. Cl. ........................................ 248/118; 248/444

(58) Field of Search .............................. 248/118, 118.1, 248/118.3, 118.5, 346, 444, 918; 400/715, 718; 273/148 B; 224/222, 267, 270; 108/43

(56) References Cited

U.S. PATENT DOCUMENTS 5,358,208 A * 10/1994 Moseley, III et al. ... 248/918 X
5,562,270 A * 10/1996 Montague ................ 248/118.1

OTHER PUBLICATIONS

Curtis brochure, page 11 entitled "Curtis Mouse Pad Organizer" circa 1993.

Page 224 of the Jun. 1994 edition of PC World concerning the Mouse Arm of Ring King Visibles and computer printout from Jun. 13, 1994 edition of InfoWorld, vol. 16, n24, p. 34(1) concerning the Ring King Visibles Mouse Arm.

* cited by examiner

*Primary Examiner*—Daniel P. Stodola
(74) *Attorney, Agent, or Firm*—Fay, Sharpe, Fagan, Minnich & McKee, LLP

(57) ABSTRACT

A platform for a computer input device includes a deck having a top surface on which an associated data input device can be selectively positioned and a bottom surface. Also provided is a base having a top surface, and a bottom surface that rests on a user's thigh. A fastening device, such as hook and loop fasteners or a screw, could be used to secure these two elements together. The deck can be selectively detached from the base in order to reverse its orientation with regard to the base and allow the platform to be switched from one thigh of the user to the other. A structure for preventing the input device from falling off the platform can be included. A rest for an operator's appendage can be located on the deck top surface. The height and angle of inclination of the deck can be adjusted, if desired, in relation to the base. Alternatively, the platform can include a support assembly having a top surface on which the associated data input device can be selectively supported and a contoured bottom surface wherein the bottom surface is adapted to rest on a thigh of the user. A structure for preventing the input device from falling off the top surface can be provided. A wrist rest can be located on the support assembly top surface. The latter embodiment can be of one piece.

26 Claims, 23 Drawing Sheets

FIG. 9
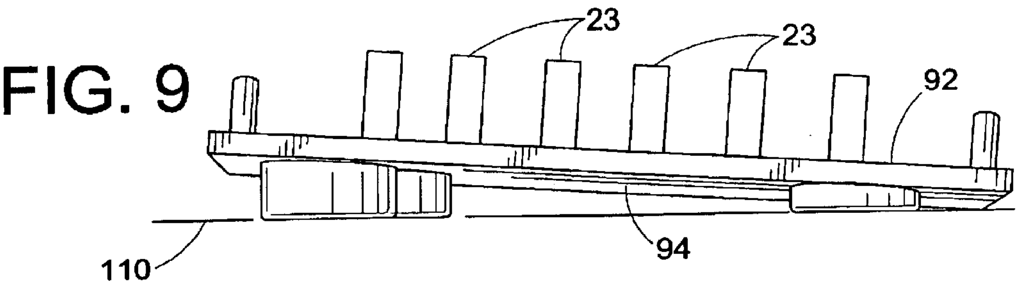
FIG. 7A
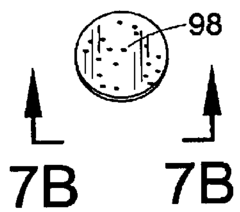
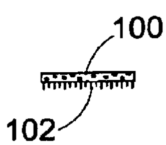
FIG. 7B
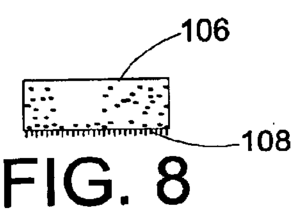
FIG. 8
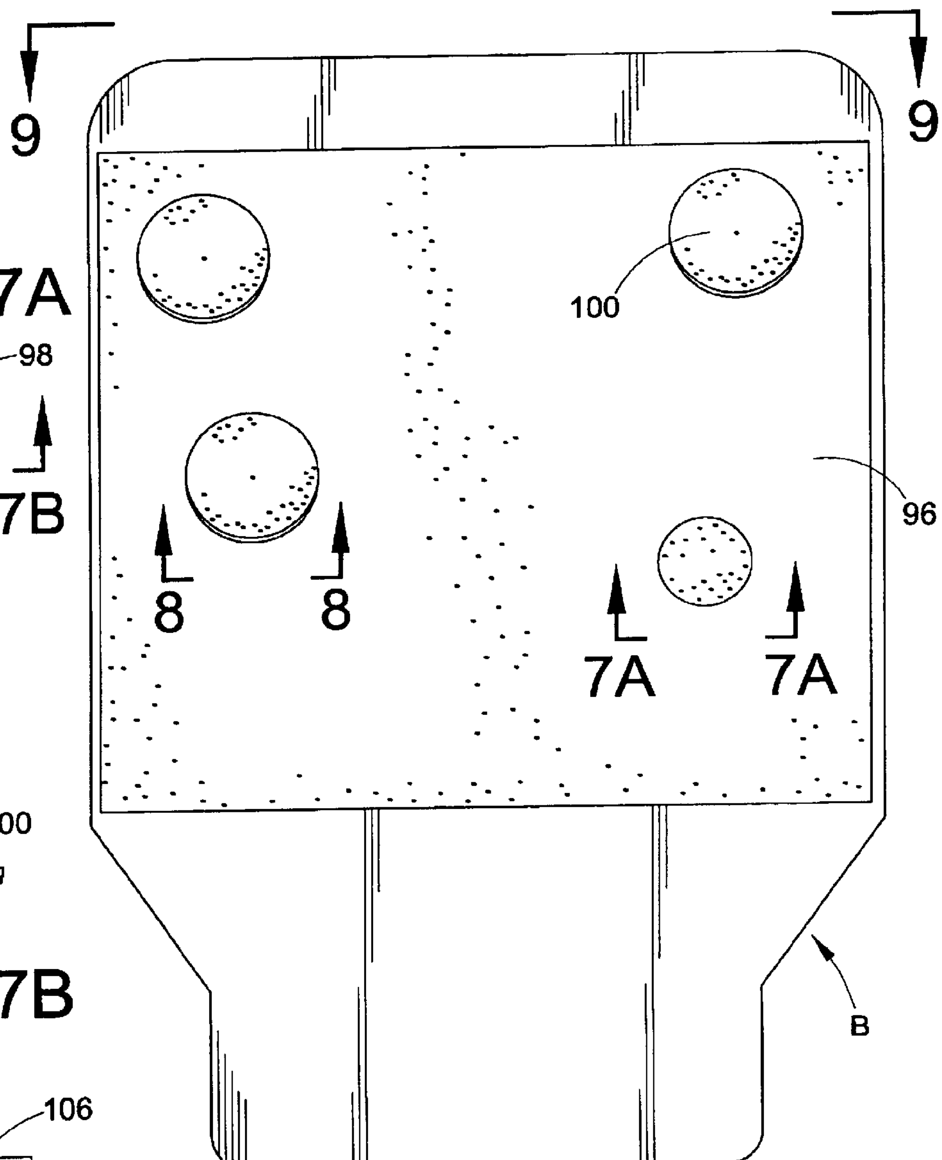
FIG. 6

PLATFORM FOR COMPUTER INPUT DEVICE

This application is a divisional of U.S. patent application Ser. No. 08/180,202 which was filed on Jan. 11, 1994 and is now abandoned.

BACKGROUND OF THE INVENTION

The present invention relates to platforms. More specifically, this invention relates to a platform for supporting a computer input device.

A variety of data input devices for computers are known. These include, for example, a mouse, a track ball, a portable track ball, a stylus, a digitizer with a tablet, a light pen and the like.

One problem with using such data input devices is repetitive strain injury to the user. Straining to perform the same hand movements over and over again eventually leads to repetitive strain injury. The most common manifestation of repetitive strain injury among typists and data input device users is carpal tunnel syndrome. A similar ailment, wrist tendonitis, has also been associated with such use. The carpal tunnel is a narrow passageway in one's wrist through which the median nerve passes. This nerve carries sensations for the entire hand. It also affects the finger flexor tendons which link one's fingers to the muscles in the person's lower arm. The tunnel is formed by walls of solid bone on three sides with the bottom enclosed by the transverse carpal ligament, a tough, inelastic cartilage. Carpal tunnel syndrome occurs when the tendons protect themselves from overuse. Each tendon is surrounded by a thick fluid filled sac called a synovial sheath, which swells with extra fluid to protect the tendon. Scientifically, this swelling is called tendonitis. When these sacs swell in the carpal tunnel, they can pinch the median nerve against the bones or the carpal ligament. The result can be loss of sensation in the hands and debilitating pain.

The popularity of the personal computer for use in office automation and computer assisted design has been found to cause repetitive motion injuries to operators of data input devices for such machines. Efforts to decrease the stresses placed on the operator's wrist or arm usually take place only after the symptoms have occurred. The need for a preventative and palliative support for the upper extremities of the operator has become more evident as more repetitive motion and stress related injuries occur.

Research suggests that computer users should limit their exposure to electromagnetic radiation emitted by certain video displays. It has been suggested that a computer user should not be able to reach the display's screen from the user's seated position. Relatedly, it is common for a seated computer user, when using a data input device on a surface such as a desktop, to lean forward. An invention allowing a computer user to sit both more upright, with better posture, and farther away from the computer's display screen is, therefore, needed. An invention that permits the operator of a data input device to use the data input device while postured in additional and various ways will reduce the amount of repetition to which the operator's body is subjected, thereby reducing the operator's chances of sustaining a repetitive stress injury.

As computers which use a mouse or other data input device become more common, the work space of an existing office is increasingly more crowded due to the presence of added computer equipment. It is, therefore, often necessary to purchase additional furniture to provide work surfaces on which to deploy the computer equipment. This is particularly true where the data input device uses a mouse, a track ball or a digitizer tablet in addition to the keyboard found in a personal computer or a computer work station system.

There is thus a need for a platform for a data input device which platform would 1) provide a more ergonomic hand and arm position for the user of the data input device and thereby reduce the possibility of repetitive motion injury to the user; 2) permit the operator of a data input device to use the data input device while postured in additional and various ways, thereby reducing the amount of repetition to which the operator's body is subjected thus reducing the operator's chances of sustaining a repetitive stress injury; 3) allow the user to sit farther from the computer's video display; 4) allow the user to sit upright and with better posture while using the data input device; and 5) reduce the need for desktop space for the data input device.

Accordingly, it has been considered desirable to develop a new and improved platform for a data input device which would overcome the foregoing difficulties and others and meet the above-stated needs while providing better and more advantageous overall results.

BRIEF SUMMARY OF THE INVENTION

In accordance with the present invention, a support structure is provided for a data input device and for an operator's extremity controlling such device.

More specifically in accordance with this aspect of the invention, the support structure comprises a deck having a top surface, on which an associated data input device can be selectively positioned, and a bottom surface. Also provided is a base having a top surface and a bottom surface. A fastening means secures the deck bottom surface to the base top surface. A place for an operator's appendage to rest is located on the deck top surface.

Preferably, a first positioning means inclines the deck on the base in a transverse direction in relation to a longitudinal axis of the deck. The first positioning means can comprise a shim having a first and a second side which each have hook and loop fastening members. These cooperate with hook and loop fastening members secured to the deck bottom surface and the base top surface. Alternatively, the first positioning means can comprise a socket located on the deck bottom surface, a ball operably secured to the base top surface and a first securing means for selectively fastening the ball to the socket in a desired location. The first securing means can comprise hook and loop fasteners.

Preferably a second positioning means raises and lowers the deck in relation to the base. The second positioning means can comprise an intermediate platform having a top surface that is operably secured to the deck bottom surface and a bottom surface including at least one projection. At least one socket can be located on the base top surface for accommodating the at least one projection of the intermediate platform. A second securing means selectively fastens the intermediate platform at least one projection at a desired level in the base at least one socket.

The deck top surface can include an indented section for accommodating a pad, such as a mouse pad. The deck can further comprise a rail extending from the top surface. The rail can have a slot for accommodating a communications wire of the data input device. The base top surface can be substantially planar whereas its bottom surface can be shaped to conform to a body surface of the user. For example, the bottom surface can be indented to conform to a thigh of the user. The base bottom surface can include a bevelled or indented corner in order to accommodate a lap of the user. The bottom surface can also include a friction generating means for preventing a sliding movement of the base on the user's thigh.

The rest for the operator's appendage can be selectively securable to the deck. The rest can comprise a wrist rest having a concave top surface and a bottom surface including a third securing means for securing the rest to the deck. The third securing means can comprise either cooperating hook and loop fasteners or a tether.

The fastening means for securing the deck to the base can comprise a socket operably secured to the deck bottom surface, a ball having a top surface, fitting in the socket and being selectively securable thereto, and a bottom surface and an intermediate platform having a top surface to which the ball bottom surface is selectively secured. The intermediate platform also can have a bottom surface comprising at least one projection with at least one socket being located on the base top surface. The at least one socket accommodates the intermediate platform at least one projection.

The data input device can comprise a pen with the deck further comprising a clip for holding the pen. Alternatively, the data input device can comprise a track ball and the deck can further comprise a means for selectively securing the track ball to the deck.

In accordance with another aspect of the present invention, a support structure is provided for a data input device used with a central processing unit (CPU) or microprocessor wherein the support structure relieves repetitive motion stress on the body of a user using such a device.

More particularly in accordance with this aspect of the invention, the support structure comprises a support assembly having a top surface, on which an associated data input device can be selectively supported, and a contoured bottom surface. The bottom surface is indented and is adapted to conform to a thigh of a user. A wrist rest is provided for the user's wrist. The wrist rest is located on the support assembly top surface.

The wrist rest can be secured to the support assembly top surface by hook and loop fasteners, by a tether or it can rest in an identation in the top surface. Alternatively, the wrist rest can be of one piece with the support assembly. If desired, the support assembly can further comprise a guardrail extending from its top surface with the rail having a slot for accommodating a communications wire of the associated data input device.

The support assembly can be of one piece, if desired. Alternatively, the support assembly can comprise a deck having a top surface and a bottom surface, a base having a top surface and a bottom surface and a fastening means for securing the deck bottom surface to the base top surface. With such a design, the deck top surface would constitute the top surface of the support assembly and the base bottom surface would constitute the bottom surface of the support assembly. A first positioning means can be provided for inclining the deck on the base in a transverse direction in relation to a longitudinal axis of the deck. Also, a second positioning means can be provided for raising and lowering the deck in relation to the base.

One advantage of the present invention is the provision of a new and improved ergonomically shaped platform for a data input device.

A further advantage of the present invention is that it makes it unnecessary for the data input device to occupy, while being used, any area located on the operator's desktop or other work surface, freeing that area for other uses.

A further advantage of the present invention is that it includes a means whereby the platform can be made tore stable by selectively engaging it with an associated desk or other structure.

A further advantage of the present invention is that it allows the user to sit farther away from the desk or other structure upon which the input device otherwise would be manipulated; in that the associated video display usually also sits on that same desk or structure, the present invention permits the user to sit farther away from the video display—and thus farther away from possibly harmful electromagnetic radiation generated by the video display.

A further advantage of the present invention is that it allows the user to sit with better posture, in an erect position; without the invention, users of a data input device tend to lean forward, toward the desk or other work surface on which the data input device rests, in a posture that can place harmful strain on the body of the user, including the user's lumbar region.

A further advantage of the present invention is that it permits a user to operate the data input device in a variety of different postures, reducing repetition that can harm the user.

A further advantage of the present invention is that it may be used without the user subjecting his or her extremities to the following postures, which may be harmful over prolonged periods: ulnar deviation of the wrist, abduction of the hands and arms, flexion of the wrists, and extension of the wrists.

A further advantage of the present invention is that the deck can be detached from the base and placed and used on a desktop or other structure with the data input device.

A further advantage of the present invention is that it is compact enough to be placed on and removed from the user's thigh with one hand.

A further advantage of the present invention is that it is compact enough to be stored in a manner that is less obtrusive than would be the case with an apparatus resting on both thighs.

A further advantage of the present invention is that it rests on the user's thigh without requiring the assistance of a user's hand.

A further advantage of the present invention is that includes means to restrict the data input device from falling off the top surface of the platform.

A further advantage of the present invention is that the top surface of the platform is indented to accommodate a wrist rest. This has at least two advantages. With respect to a slidable wrist rest, the indentation confines the wrist rest, restraining it from restraining it from falling off said top surface. With respect to a wrist rest secured to said top surface by a hook and loop fastener (such as VELCRO®), it permits a user wishing to use the platform without a wrist rest for awhile (in order to vary the user's routine) to put a plug in said indentation to bring the indented area level with said top surface of the platform; in the absence of said indentation, a user wishing to use the platform without a wrist rest would suffer irritation of the wrist by the hook and loop fastener.

A further advantage of the present invention is that it includes a means to restrain the communications cable for the data input device from interfering with the operation of the data input device.

A further advantage of the present invention is that its top surface can display a pattern detectible by an optical mouse or similar data input device.

A further advantage of the present invention is that its top surface can display information desired by the user.

A further advantage of the present invention is that its top surface can have an indentation for a pad providing a desired surface upon which a data input device may be manipulated.

A further advantage of the present invention is that it can provide a means for harmlessly discharging static electricity that accumulates.

A further advantage of the present invention is that it can be selectively positioned at various points along the thigh of the user, with an indentation in the invention permitting the invention to be positioned close to the user's abdomen.

Still another advantage of the present invention is the provision of a platform for a data input device which reduces the tendency of the operator to suffer repetitive motion injury during the operator's use of the data input device. This is accomplished by allowing the wrist and arm of a user to rest in a neutral position adjacent a user's thigh.

Yet another advantage of the present invention is the provision of a platform for a data input device which platform is supported on and conforms to a thigh of the user and frictionally resists sliding movement therealong. The platform can be moved from one thigh of the user to the other so as to enable both righthanded and lefthanded users to utilize the data input device.

Still yet another advantage of the present invention is the provision of a platform for a data input device which allows a location and a height of a wrist rest on the platform to be adjusted to suit the needs of the user. The wrist rest can, furthermore, be padded or contoured as desired.

Yet still another advantage of the present invention is the provision of a platform for a data input device which can be customized to the needs of the user. The platform comprises a deck and a base. The height as well as the pitch, roll and yaw of the deck, on which the data input device is supported, can be adjusted in relation to the base in order to accommodate varying sizes of users.

A further advantage of the present invention is the provision of a support structure or platform for a data input device which support structure includes a base, a deck and a fastening means for selectively securing the base to the deck.

A still further advantage of the present invention is the provision of a platform for a data input device wherein the platform is of one piece.

A yet further advantage of the present invention is the provision of a platform which can accommodate a variety of different data input devices such as a mouse, a track ball, a stylus, a digitizer, a light pen or the like.

An additional advantage of the present invention is the provision of a platform for a data input device wherein the platform can be equipped with a variety of inserts in order to accommodate a variety of sizes of data input devices in a socket of the platform.

Still other benefits and advantages of the invention will become apparent to those skilled in the art upon a reading and understanding of the following detailed specification.

BRIEF DESCRIPTION OF THE DRAWINGS

The invention may take physical form in certain parts and arrangements of parts preferred embodiments of which will be described in detail in this specification and illustrated in the accompanying drawings which form a part hereof and wherein:

FIG. 6 is a bottom plan view of a deck according to a second embodiment of the present invention;

FIG. 7A is a top plan view of a spacer member illustrated in FIG. 6;

FIG. 7B is a side elevational view of the spacer member of FIG. 7A along lines 7B—7B;

FIG. 8 is a side elevational view of another spacer member of FIG. 6 along lines 8—8;

FIG. 9 is an end elevational view of the deck of FIG. 6 supported on a planar surface;

DETAILED DESCRIPTION OF THE PREFERRED EMBODIMENTS

Figure 1:
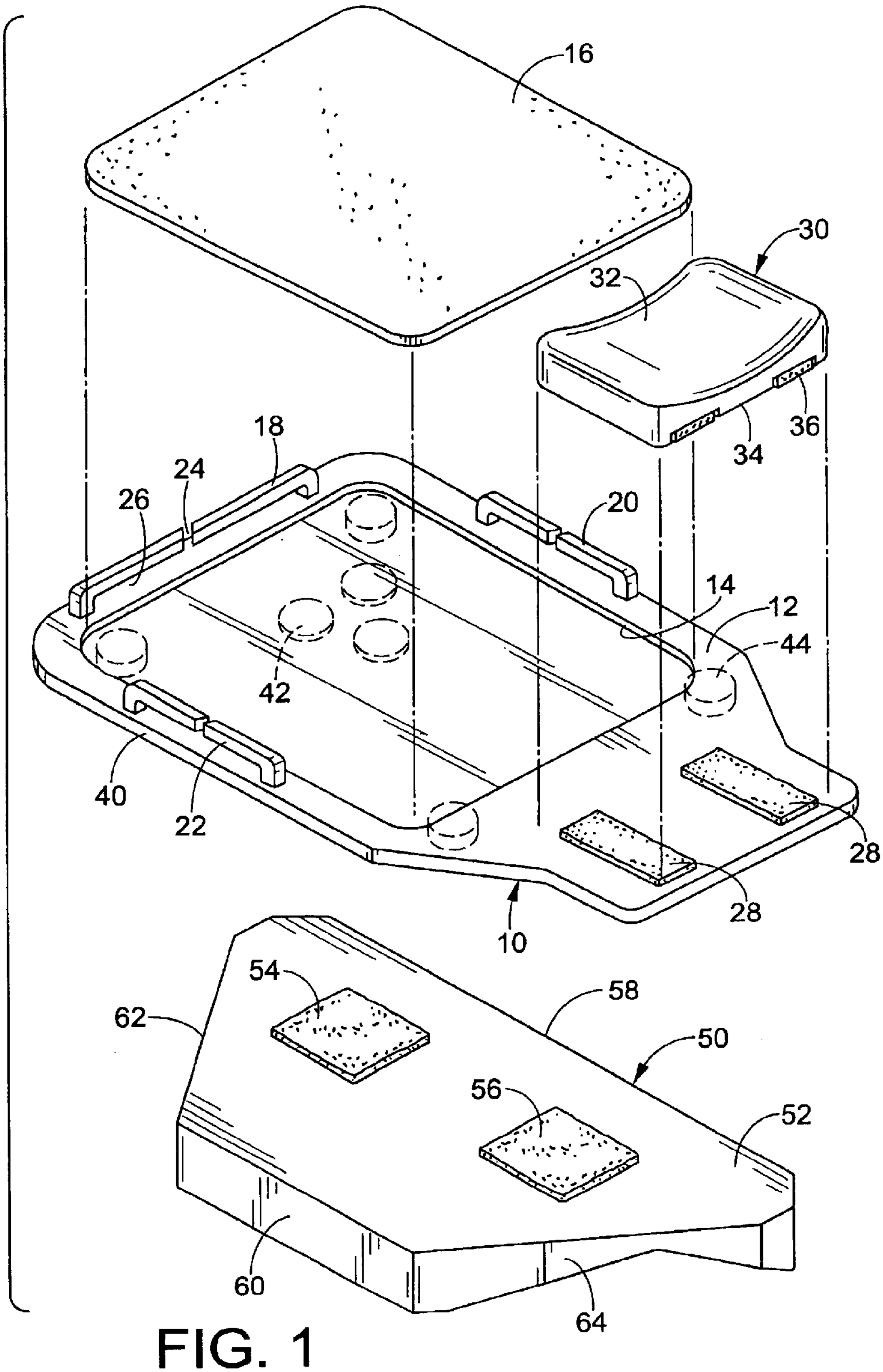
FIG. 1 is an exploded perspective view of a platform for a data input device according to a first embodiment of the present invention.

Referring now to the drawings, wherein the showings are for purposes of illustrating the preferred embodiments of the invention only and not for purposes of limiting same, the figures illustrate a variety of platforms for computer input devices. While only two types of computer input devices will be illustrated in the drawings, namely, a computer mouse and a track ball, it should be appreciated by those of average skill in the art that a large-number of other types of computer input devices could also be employed with the platforms illustrated herein. Some of these input devices are sometimes called pointing devices. Moreover, the platforms illustrated herein can also be used with input devices for interactive optical disks (CD-I) and interactive television as well as for minicomputers microcomputers, work stations and the like.

Figure 5:
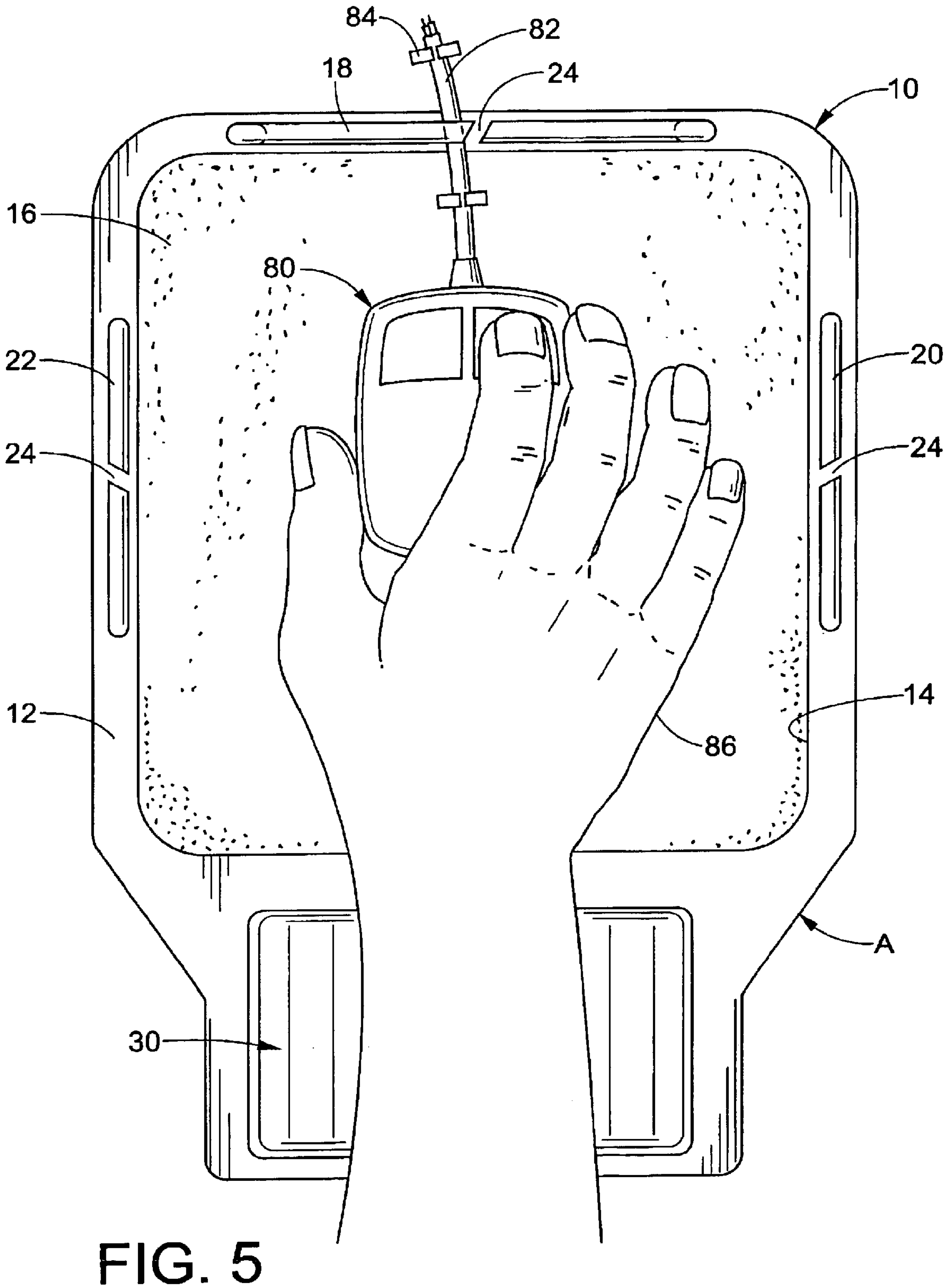
FIG. 5 is a top plan view of the platform of FIG. 1 in use with a data input device in the form of a mouse.

With reference now to FIG. 5, a first type of platform A is there illustrated. This platform comprises a deck 10 which includes a top surface 12 having therein a centrally located indented section 14 which may be of substantially rectangular form. The indented section is meant to accommodate a conventional mouse pad 16 so that the pad is flush with the top surface 12. Located around three sides of the deck top surface are first, second and third rails 18, 20 and 22. To reduce obstruction encountered by a signal transmitted by a wireless input device, the rail 18 could be of a reduced height or vertically oriented posts extending from the top surface of the deck and spaced at appropriate intervals could be substituted for the rail 18 (such parts are illustrated in FIG. 9 of the drawings where they are identified by the numeral 23).

With reference now also to FIG. 1, each of these rails includes a slot 24 which leads to an elongated opening 26. Also provided on the deck along a fourth side thereof are a pair of spaced hook and loop fastener strips 28. These are meant to selectively secure a wrist rest 30 in position on the deck 10.

Figure 3:
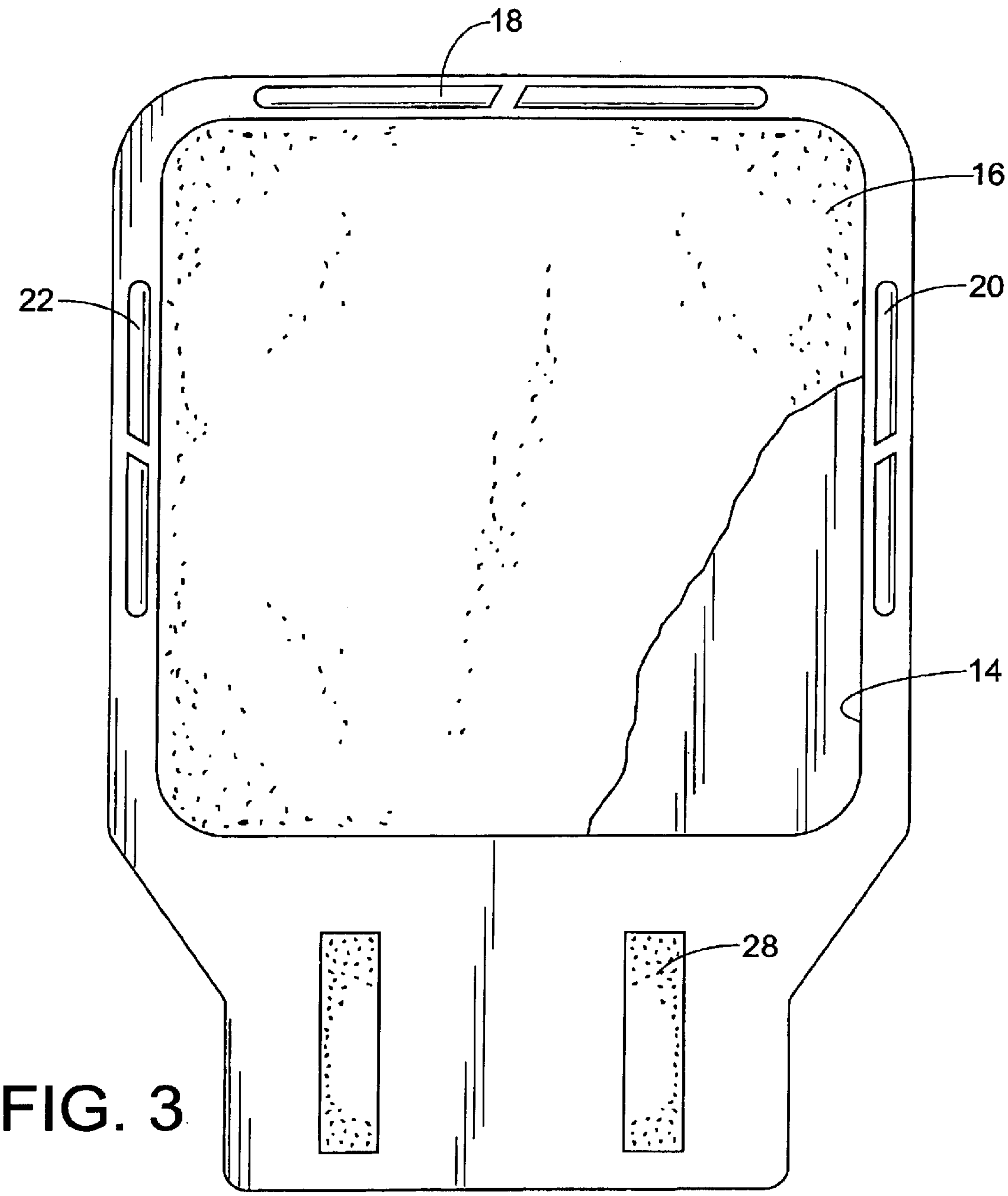
FIG. 3 is a top plan view of a deck of the platform/of FIG. 1.
Figure 4:
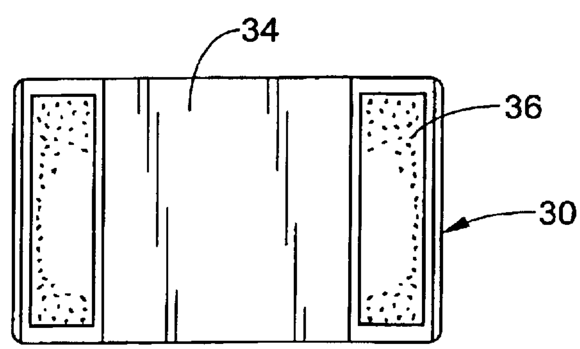
FIG. 4 is a bottom plan view of a wrist rest of the platform of FIG. 1.

The wrist rest has a contoured top face 32 and a generally flat bottom face 34 which is provided with a pair of spaced indentations accommodating hook and loop fastener strips 36 (see FIG. 4). The wrist rest hook and loop fastener strips 36 cooperate with the deck hook and loop fastener strips 28 to secure the wrist rest in place. Such hook and loop fasteners are conventional and are known by the trademark VELCRO. It is evident that since the wrist rest 30 is selectively securable to the deck 10, the wrist rest can be moved either closer to or further away from the mouse pad 16 illustrated in FIG. 3 as may be necessary dependent upon the size of the hand and forearm of the operator employing the platform. If desired, wrist rests of varying thicknesses can be provided so that the user can employ the desired thickness of wrist rest as may be fitted to the user's anatomy.

The deck 10 also includes a bottom surface 40 on which are located a number of spaced hook and loop fastener disks 42. Further provided on the deck bottom surface are a number of spaced feet 44. The deck 10 is selectively securable to a base 50. The base includes a top surface 52 on which are located a pair of spaced hook and loop squares 54 and 56. One of these squares can cooperate with the hook and loop fastener disks 42 provided on the bottom surface of the deck 10 in order to selectively secure the deck in place on the base. Two such squares 54 and 56 are provided in order that the deck 10 can be reversed on the base 50 as may be necessary for the comfort of the operator.

It can be seen in this regard that the base 50 has a trapezoidal shape. More specifically, the base has a longer first side edge 58 and a shorter second side edge 60 so that the base comprises first and second bevelled edges 62 and 64 leading from the second side edge 60 toward the first side edge 58. This construction allows the base to be located either on a user's right thigh in the orientation illustrated in FIG. 1, with the bevelled edge 64 facing the groin of the user, or reversed and placed on the left thigh of the user, with the bevelled edge 62 facing the groin of the user. When the base 50 is positioned on the left thigh of the user with the bevelled edge 62 facing the groin of the user, the hook and loop square 56 cooperates with the hook and loop disks 42 of the deck to secure the deck to the base.

It should be appreciated that a base 50 not having any bevelled or indented corners could also be provided, although this would be somewhat less comfortable for the user. In addition, one could provide a base having only one bevelled or indented corner. Either of these variations would increase the amount of weight resting on the inside edge of the thigh thereby making the unit less prone to tilting towards the outside edge. However, to some extent, such tilting can be avoided merely by displacing the deck 10 towards the second edge 60 of the base 50 if the hook and loop pads 54 and 56 were similarly moved towards the second side edge 60. This change would move the center of gravity of the platform towards the inside of the user's thigh.

Figure 2B:
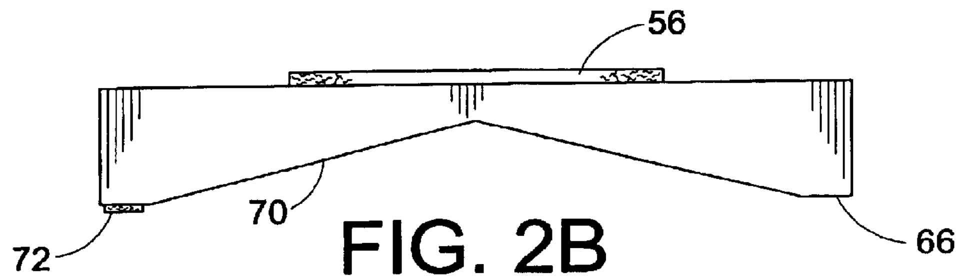
FIG. 2B is an end elevational view of the base of the platform of FIG. 1.
Figure 2A:
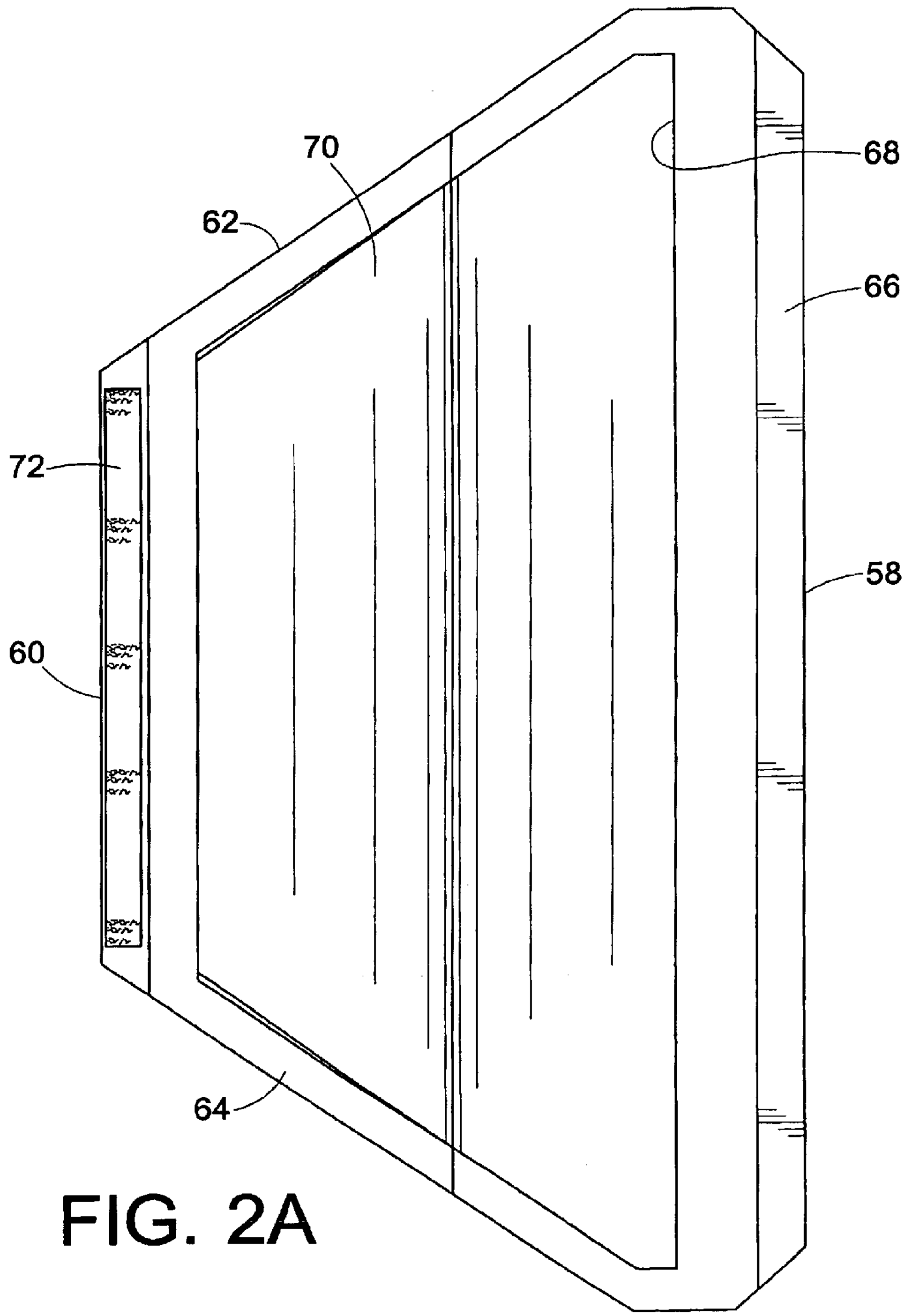
FIG. 2A is a bottom plan view of a base of the platform of FIG. 1.

With reference now also to FIG. 2A, the base includes a bottom surface 66 having therein a substantially trapezoidally shaped indented section 68. The indented section 68 is meant to accommodate an insert 70 of a suitable thermoplastic material which provides friction properties so as to retard a sliding movement of the base on the thigh of the user. It can be seen from FIG. 2B that the insert 70 and, indeed the entire bottom surface 66 of the base 50, has a substantially concave shape. This shape allows the base to be stably positioned on the thigh of a user. If desired, a hook and loop fastener strip 72 can be located along one edge of the base bottom surface 66. The strip 72 is advantageous for securing the entire platform A to a suitable hook and loop strip (not illustrated) provided, e.g., on the top surface of a monitor (not illustrated) when it is desired to store the platform A in a non-use position.

With reference again to FIG. 5, the platform A is meant to accommodate a data input device such as a mouse 80. The mouse 80 is secured to a communications cable 82 which can be pushed through the slot 24 in the first rail 18 and thus slide along the opening 26 as the mouse is moved laterally on the mouse pad 16. It should also be evident, that the communications cable 82 of the mouse can be snapped through the identical slots in the second and third rails 20, 22 if that is considered advantageous. The bumpers 18, 20 and 22 comprise a confining means and protect the input device from being damaged by falling off the platform A and to the floor. If desired, suitable conventional bumpers 84 can be positioned on the communications cable 82 so as to limit a longitudinal range of movement of the mouse 80 in relation to the first rail 18. It should be appreciated that the platform A can also accommodate a conventional wireless mouse, if desired.

Preferably, the deck 10 and base 50 are made of a suitable conventional thermoplastic material. However, they could also be made of wood or another type of non-conductive, anti-static and non-ferrous material. The material should also be cleanable, hypoallergenic, hygienic and aesthetically pleasing. A known material that retards electromagnetic waves, such as lead foil, can be incorporated in the platform.

With reference now to FIG. 6, a second type of platform B is there illustrated. This platform includes a deck 90 having a top surface 92, as shown in FIG. 9, and a bottom surface 94. Located on the bottom surface 94 is a large size sheet 96 of hook and loop material. Selectively securable at a desired location to the sheet are shims or spacers, such as a first small diameter spacer 98 (see FIG. 7A) having a top surface 100 which faces away from the hook and loop sheet 96 and a bottom surface 102 (see FIG. 7B) which is provided with hook and loop material to cooperate with the hook and loop sheet 96. Another type of spacer 104 can also be secured to the hook and loop sheet 96. This spacer is of a larger diameter and thicker than the first type of spacer 98 as is evident from a comparison of FIG. 8 with FIG. 7B. The second type of spacer also includes a top surface 106 facing away from the sheet 96 and a bottom surface 108 which is provided with hook and loop material to cooperate with the hook and loop sheet. In this way, as is illustrated in FIG. 9, the deck 90 can be tilted along its longitudinal axis in relation to a support surface 110.

The support surface 110 can be either a desk surface or a base such as the base 50 illustrated in FIG. 1. To this end, the base would then also need to be provided with a large hook and loop sheet on its top surface. The first and second types of spacers 98, 104 would have their top surfaces 100 and 106 covered with hook and loop material in order to cooperate with the hook and loop sheet covering the top face of the base. The spacers 98 and 106 would then also serve as the means for securing the deck 90 to the base.

Figure 11:
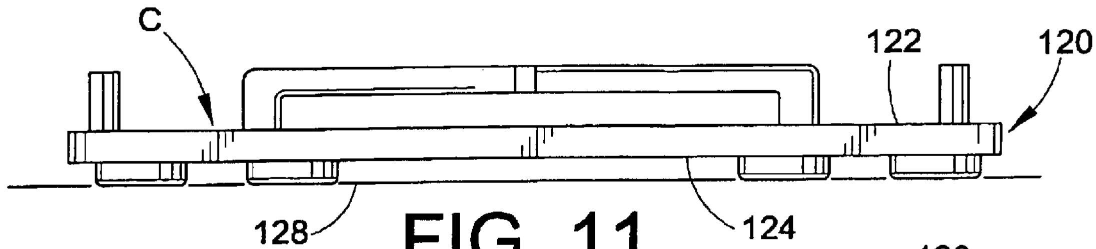
FIG. 11 is an end elevational view of the deck of FIG. 10 supported on a planar surface.
Figure 10:
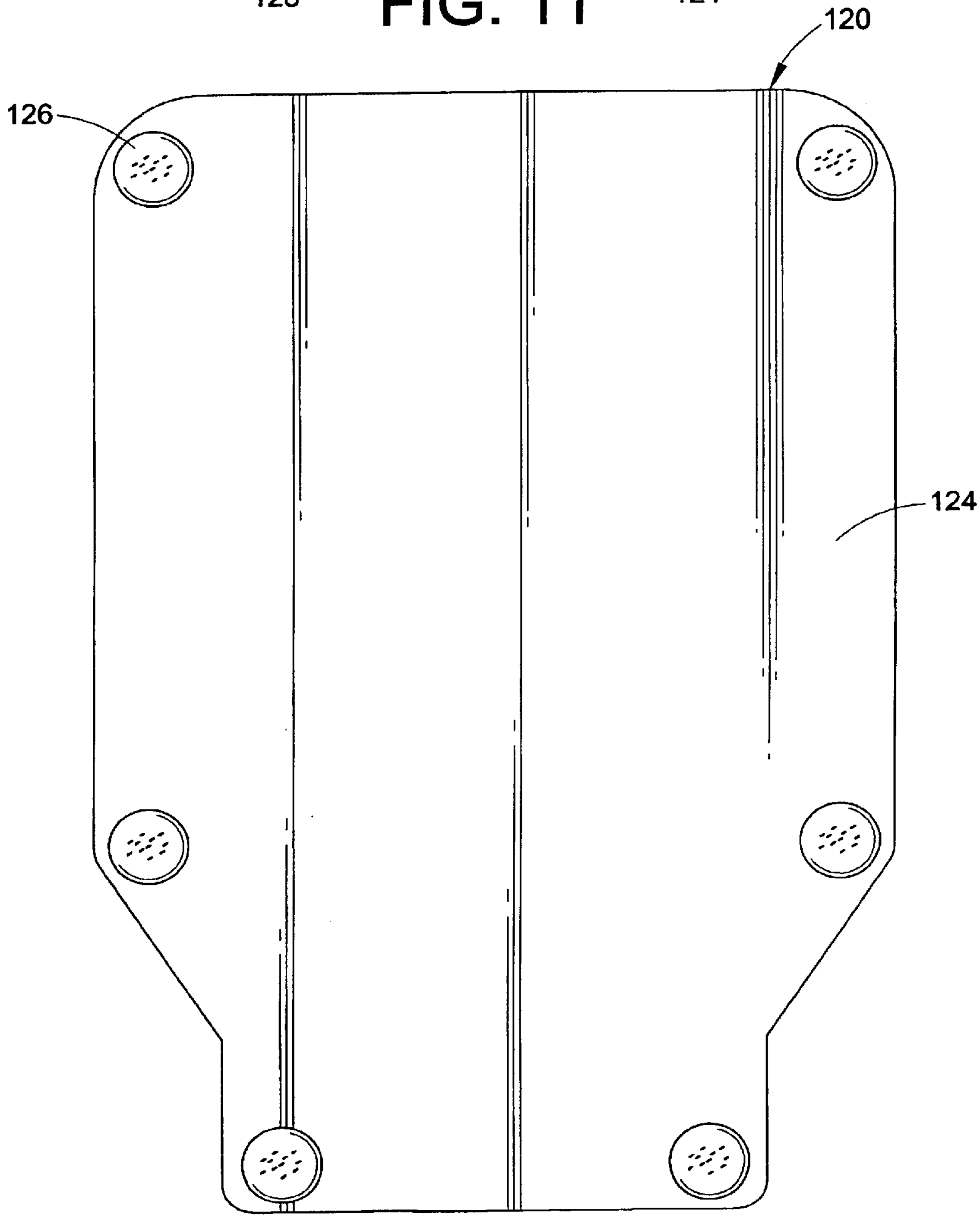
FIG. 10 is a bottom plan view of a deck according to a third embodiment of the present invention.

With reference now to FIG. 11, yet another type of platform C is there illustrated. This platform includes a deck 120 having a top surface 122 which can include a series of rails, as previously discussed, and a bottom surface 124. The bottom surface can be provided with a plurality of spaced feet 126 as is more readily apparent from FIG. 10. It can be seen from FIG. 11 that the feet 126 of the deck 120 are each of a substantially identical thickness so that the deck 120 is substantially level in relation to a subjacent support surface 128. This support surface can be a desk top, a slide-out writing surface which is conventional to desks, or even a drawer of the desk if desired.

Figure 12:
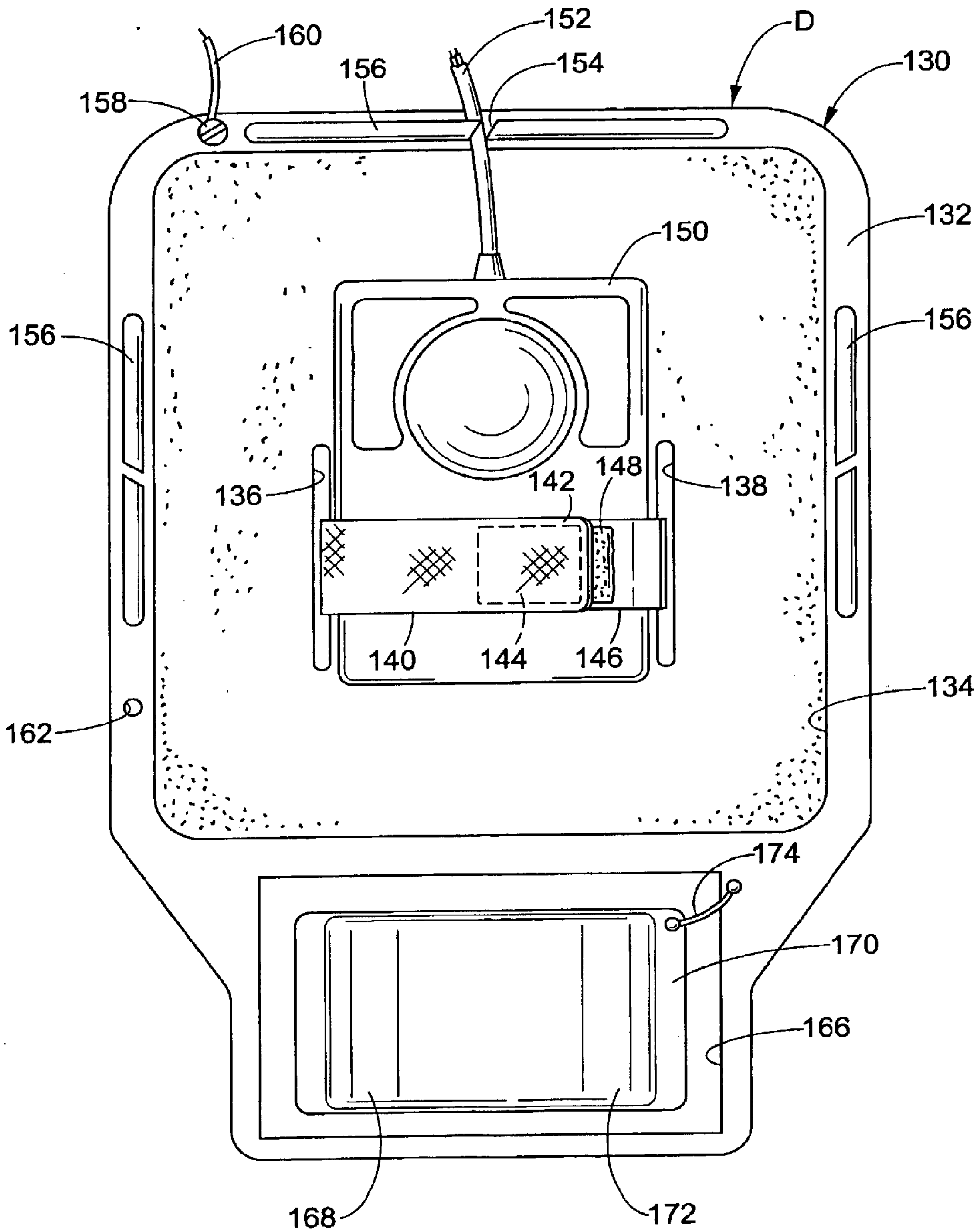
FIG. 12 is a top plan view of a deck according to a fourth embodiment of the present invention illustrating the deck supporting a data input device in the form of a track ball.

With reference now to FIG. 12, yet another type of platform D is there illustrated. This platform includes a deck 130 having a top surface 132 on which is provided a first indented section 134. Extending through the deck 130 and located in the first indented section 134 are a pair of spaced longitudinally extending slots 136 and 138. A fastener band 140 can be looped through the pair of spaced slots 136, 138 around the body of the deck 130. The fastener band includes a first end 142 having on a lower surface thereof a strip of hook and loop material 144. The fastener band also includes a second end 146 having on a top surface thereof a hook and loop strip 148. It is evident that the hook and loop strips 144, 148 can cooperate with each other in order to secure the two ends of the band together.

The band 140 is meant to hold a suitable conventional track ball 150 to the deck 130. Since the slots 136, 138 are elongated, the fastener strap 140 can be moved longitudinally along the length of the two slots in order to secure the track ball 150 at a desired location in the indented section 134. This will accommodate users having different sized forearms and hands. Since the two ends of the band 140 can be secured to each other at a range of longitudinally spaced locations, the band can accommodate a number of track balls having different thicknesses and widths.

The track ball 150 has a communications wire 152 as is well known in the art. This wire can extend through a slot 154 in a rail 156 as discussed previously. Similar rails 156 with slots can be provided along the two side edges of the deck top surface 132 to provide a confining means for the track ball. Located adjacent the rail 156 is a grounding screw 158 which is in electrical communication with a grounding wire 160. The grounding screw is advantageous in order to safely dissipate static charges which may prove harmful to the computer in communication with the track ball 150. While a track ball with a communication wire is shown, wireless track balls are also known and could be used with the platform D.

Figure 21A:
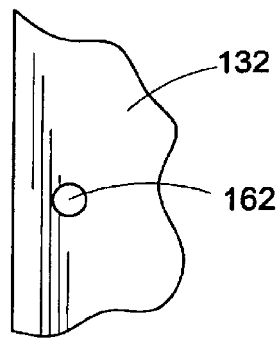
FIG. 21A is a fragmentary top elevational view of the platform of FIG. 12 illustrating a socket.
Figure 21B:
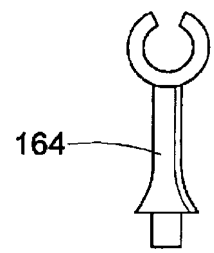
FIG. 21B is an end elevational view of a clip meant to be selectively secured in the socket of FIG. 21A.

Located along one of the side edges of the deck top surface 132 can be a socket 162. With reference now also to FIG. 21A, the socket 162 is meant to accommodate an end of a suitable clip-type support 164. The support can hold a stylus (not illustrated) of the type which is known to the art. It should be appreciated that the stylus and track ball would not likely be used at the same time. It should also be appreciated that the track ball 150 can be removed along with the fastener strap 140. If this is done, the first indentation 134 can accommodate a suitable mouse pad such as the mouse pad 16 illustrated in FIG. 1. This then enables the deck 130 to accommodate a variety of different input devices for a microprocessor based system such as a personal computer or a work station.

Also located on the top surface 132 of the deck 130 is a second indented section 166. This section is meant to accommodate a wrist rest 168 in a slidable manner. The wrist rest includes a top surface 170 which may be contoured as at 172 to accommodate the wrist of a user. The wrist rest 168 is secured to the deck 130 by a suitable tether 174. As the wrist rest 168 is smaller in both width and length than the second indented section 166, the wrist rest can slide forwards and backwards, as well as sideways, in the indented section of the deck 130 as the user moves his hand when employing a mouse or the like. In order to allow a sliding of the wrist rest 168 in relation to the deck 130, the lower surface (not illustrated) of the wrist rest is provided with a suitable conventional low friction material such as the polytetrafluoroethylene material sold under the TEFLON mark. The indented section 166 similarly has a low friction surface in order to allow the wrist rest to slide on the base.

Figure 19:
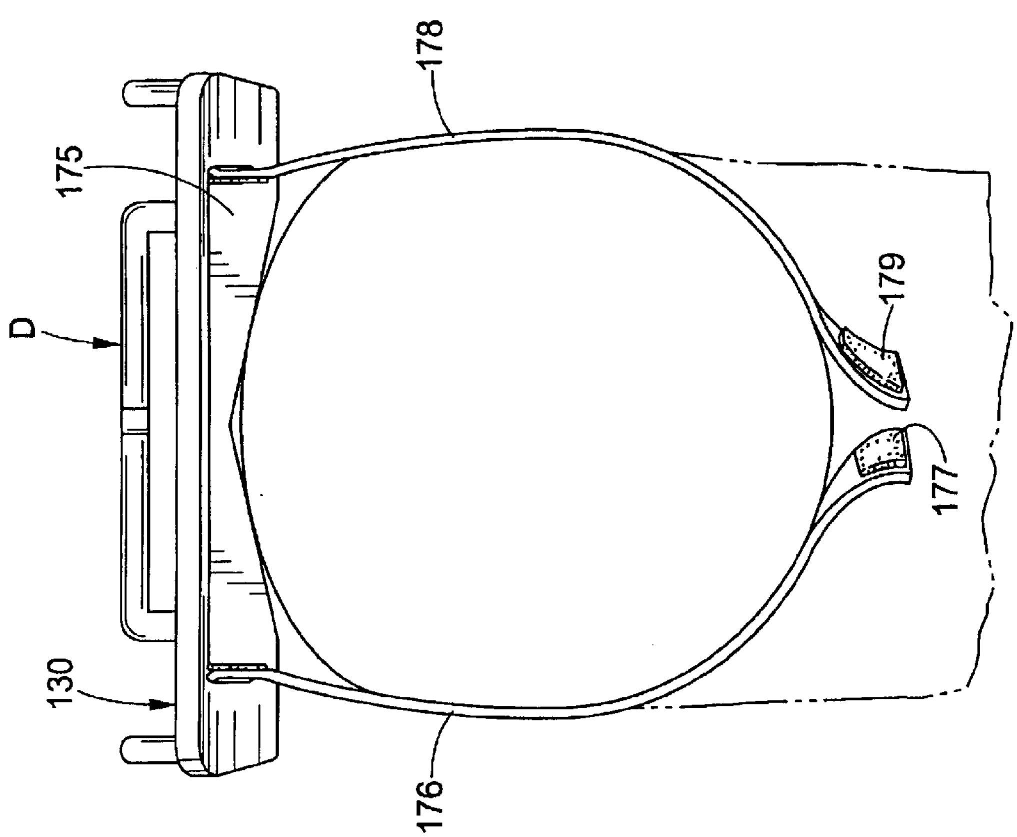
FIG. 19 is a perspective view of the platform of FIG. 12 being secured around a thigh of a user.

With reference now to FIG. 19, the deck 130 is secured to a base 175. Secured to one side edge of the base is a first strap section 176 having at the free end thereof a first hook and loop fastener strip 177. Secured along a second side edge of the base 175 is a second strap 178 having at a free end thereof a second hook and loop strip 179. When the hook and loop fastener strips 177 and 179 are secured to each other, the strap holds the platform D to the thigh of a user. The straps allow a user wearing pants to secure the platform D around a thigh.

Figure 13:
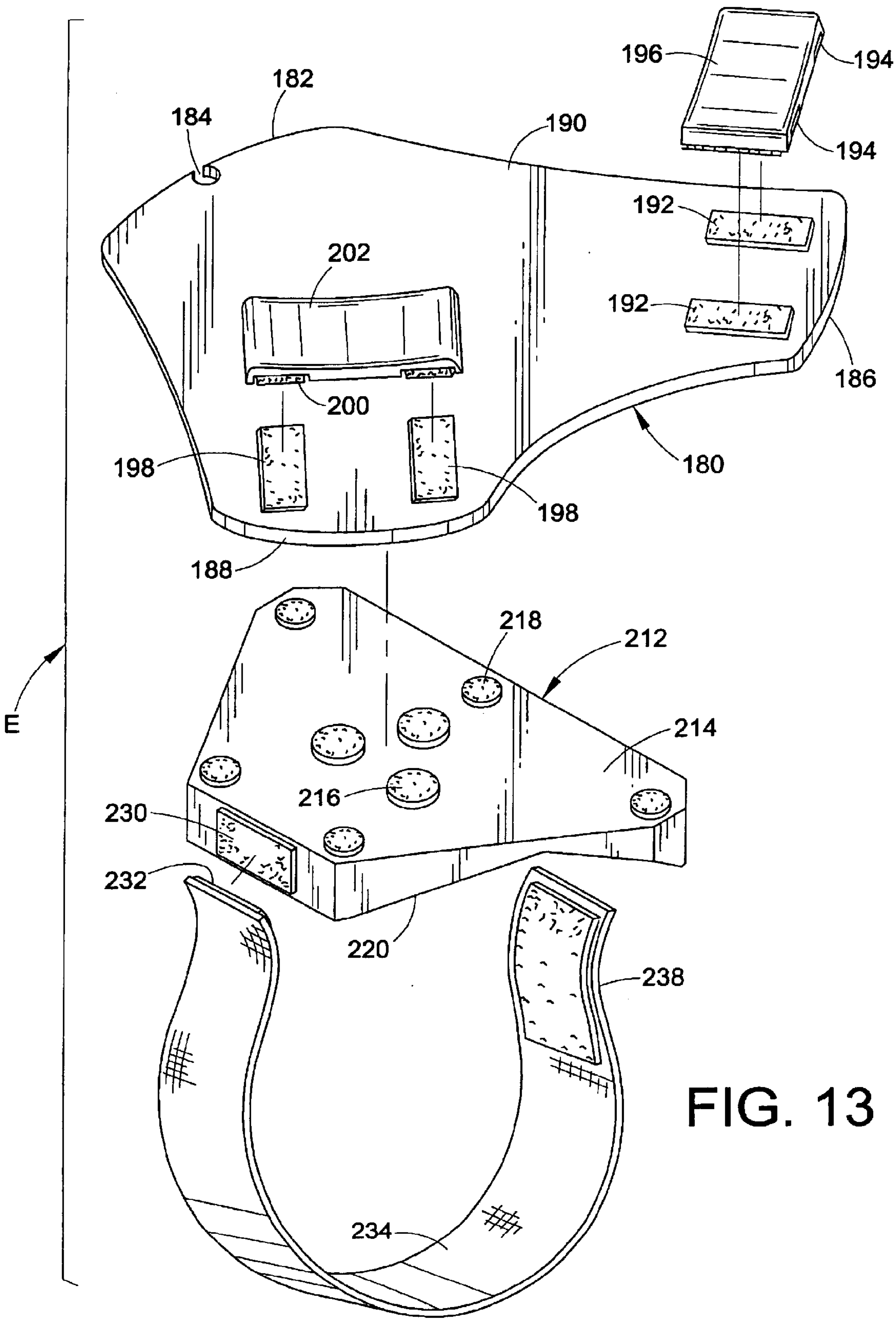
FIG. 13 is an exploded perspective view of a platform according to a fifth embodiment of the present invention.

With reference now to FIG. 13, a fifth type of platform E for a data input device is there illustrated. In this embodiment, the platform comprises a deck 180 having an upper end 182 in which is located a slot 184. The slot is meant to accommodate the communications wire of a mouse or track ball as previously discussed. In this embodiment, the deck includes spaced first and second legs 186, 188 so as to define a somewhat Y-shaped body. A top surface 190 of the deck includes a first set of hook and loop fastener strips 192 which cooperate with hook and loop fastener strips 194 located on the bottom face of a first wrist rest 196. A second set of hook and loop fastener strips 198 is located on the second leg 188. The latter fastener strips cooperate with suitable hook and loop fastener strips 200 provided on the bottom face of a second wrist rest 202.

Figure 14:
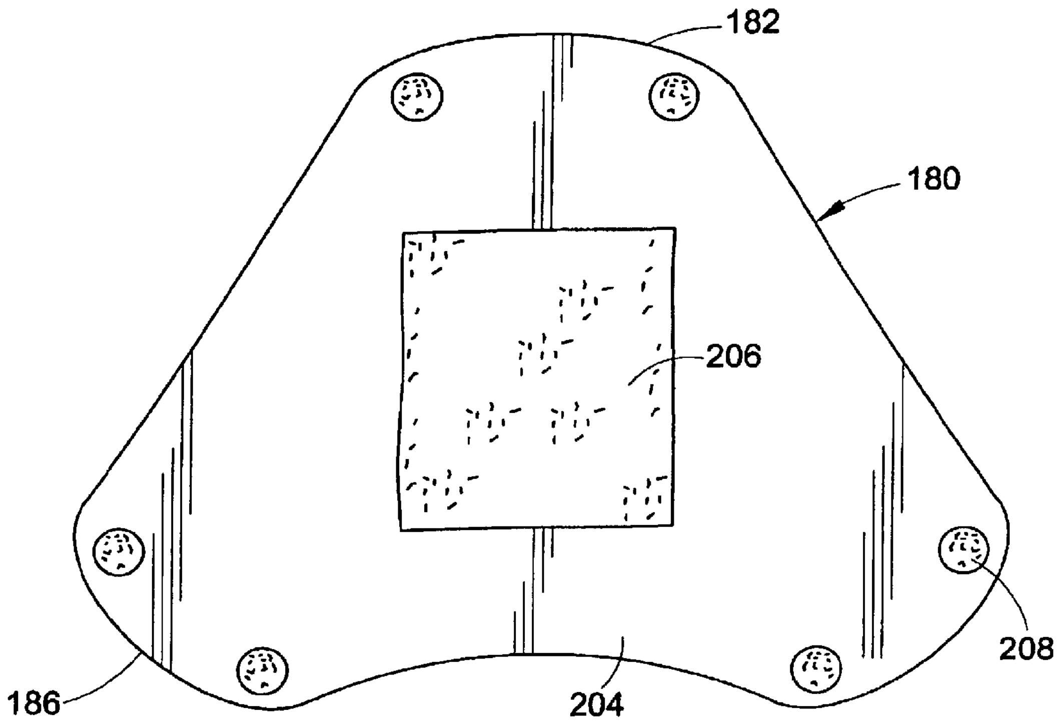
FIG. 14 is a bottom plan view of a deck of the platform of FIG. 13.

With reference now also to FIG. 14, the deck 180 also includes a bottom surface 204 on which is located a square patch 206 of hook and loop material. Located along the edges of the deck bottom surface are a plurality of feet 208. With reference again to FIG. 13, the deck is meant to be selectively secured in place on a base 212. The base includes a top surface 214 having a plurality of spaced disks 216 of hook and loop material. These are meant to cooperate with the hook and loop patch 206 on the bottom face of the deck 180. Because of the large size of the hook and loop patch 206 on the deck bottom surface, the deck can be accommodated at a large number of positions on the base 212 in order to suit the user of the platform and its data input device. Also located on the base 212 are a series of base feet 218. These and the deck feet 208 stabilize the deck 180 in order to insure that the deck does not wobble on the base.

Figure 15:
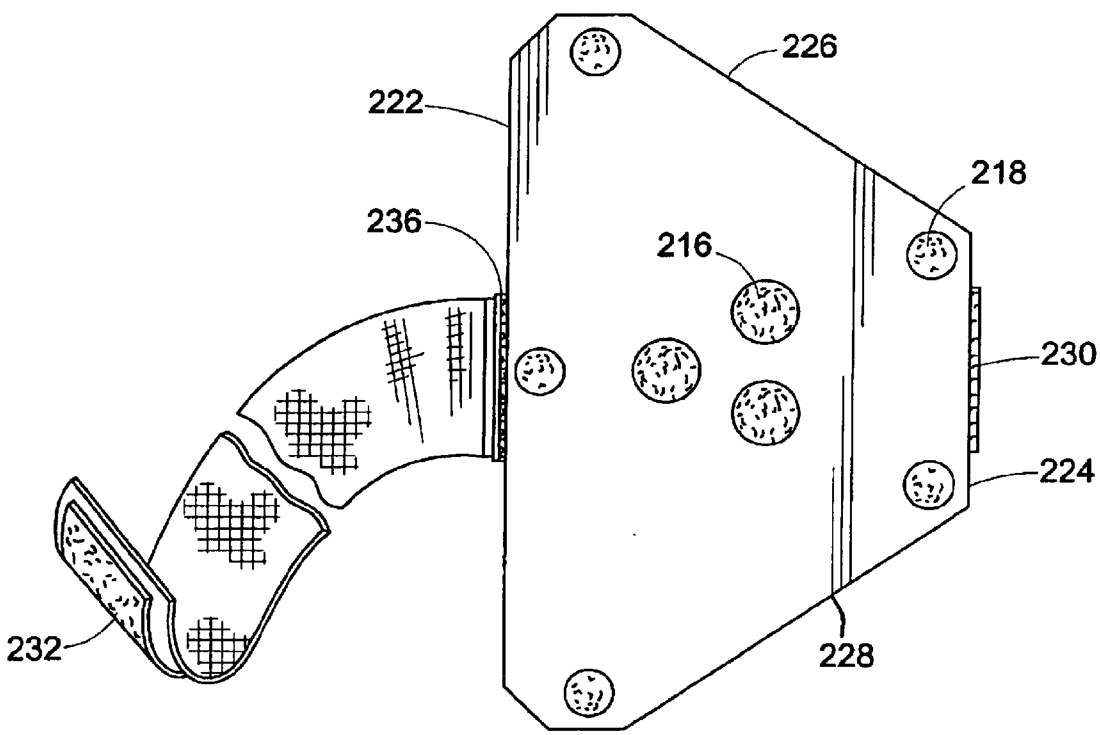
FIG. 15 is a top plan view of a base of the platform of FIG. 13.

The base 212 also includes a bottom surface 220 which may be indented to accommodate a user's thigh, as previously discussed. With reference now also to FIG. 15, in which the base 212 is rotated 180 degrees in relation to its orientation in FIG. 13, the base includes a first side 222 which is longer than a second side 224 thereof. Defined between the first and second sides are a pair of bevelled or indented edges 226 and 228. Such bevelling or indentation enables the base to be rotated 180 degrees and be used either on a user's right thigh or on his left thigh while still accommodating the lap of the user.

One means of securing the base to the user's leg is illustrated in FIGS. 13 and 15. To this end, a pad 230 of hook and loop material can be located on the second side 224 of the base. Selectively fastenable to the pad 230 is a swatch 232 of a hook and loop material that is secured to an end of a strap 234. Secured on the first side 222 of the base 212 is a second pad 236 of hook and loop material to which a second swatch 238 of hook and loop material fastened to another end of the strap 234 can be selectively secured. In this way, if the user is wearing pants, the strap can be used to fasten the base 212, and hence the deck 180 of the platform E around the user's thigh.

Figure 16C:
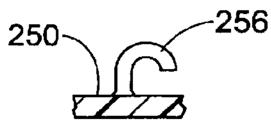
FIG. 16C is an enlarged side elevational view, partially in cross-section, of a portion of the platform of FIG. 16A along line 16C—16C.
Figure 16A:
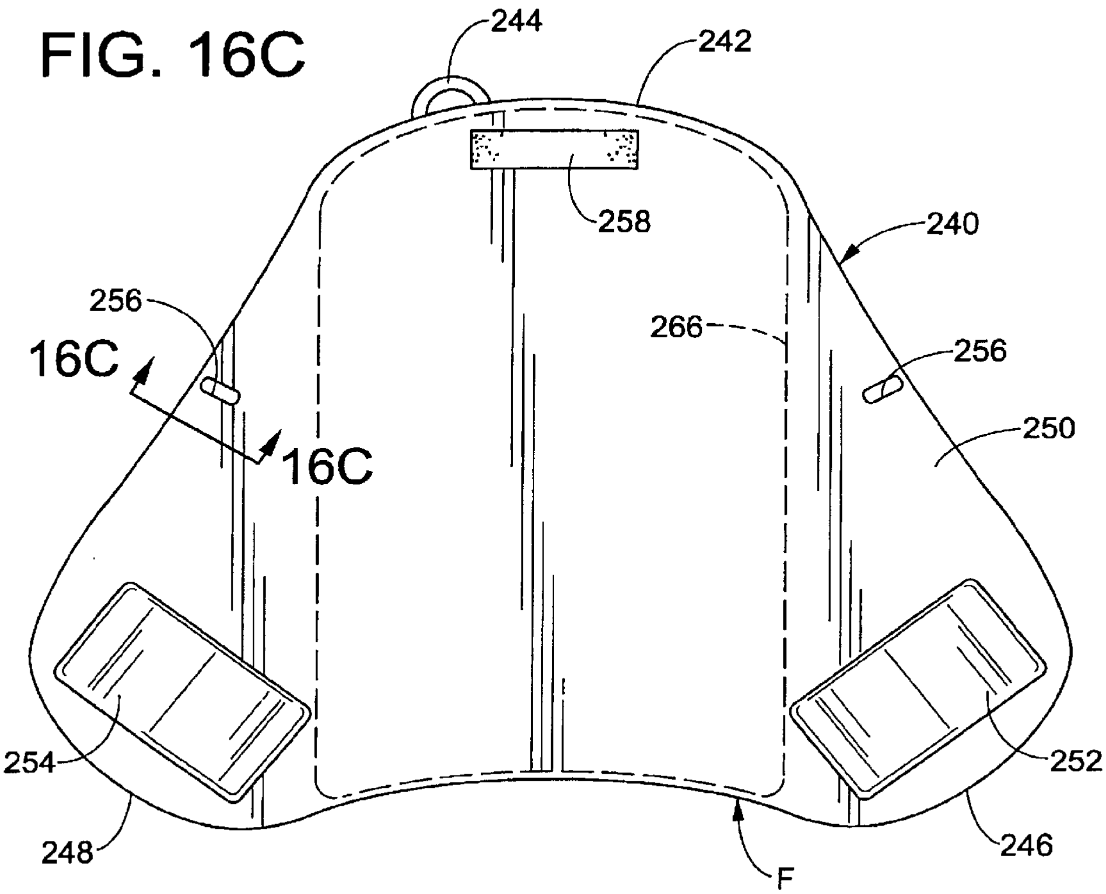
FIG. 16A is a top plan view of a platform according to a sixth embodiment of the present invention.

With reference now to FIG. 16A, a sixth type of platform F is there illustrated. This platform includes a deck 240 having an upper end 242 on which is located a loop 244. The loop may be useful in securing the entire platform F to a suitable support member such as a hook (not illustrated) located on, e.g., a wall or on a side of a desk or even on a computer terminal. The deck 240 also includes on a lower end spaced first and second legs 246, 248 so as to define a somewhat triangular or Y-shaped body. The deck includes a top surface 250 on which are located first and second wrist rests 252 and 254. These are adjacent a respective one of the first and second legs 246 and 248. In this embodiment, the wrist rests 252 and 254 are permanently secured to the deck 240. In fact, the wrist rests may be of one piece with the deck if so desired. The deck 240 can be made of a suitable thermoplastic. The wrist rests can be made of the same material as the deck or of a different, softer, thermoplastic.

Located on the deck upper surface, adjacent its side edges, are clips 256. As illustrated in FIG. 16C, each clip can be in the form of an upside down and backwards J. The clip 256 can be used to accommodate, e.g., a stylus or a pen. Located adjacent the upper end 242 of the deck is a hook and loop strip 258. The strip of hook and loop material can be used to selectively secure a clip 260 (see FIG. 16B) in place on the deck. The clip 260 can have the form of a known clothes pin including an aperture 262 through which the communications wire of a mouse or track ball can extend. As is well known, such a clip includes a resilient biasing means which urges the two legs of the clip together in order to allow the communications wire to be secured in place in the clip 260.

Figure 16B:
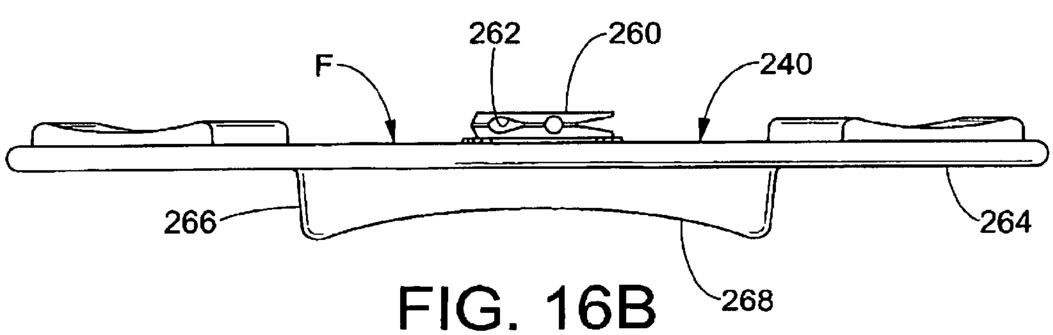
FIG. 16B is an end elevational view of the platform of FIG. 16A.

With reference now to FIG. 16B, the deck 240 also includes a bottom surface 264 on which is defined a base 266. The base has a concave lower surface 268. It is evident that the base 266 is secured to the deck 240. In fact, if desired, the deck 240 and base 266 can be made of one piece, such as by injection molding or blow molding from a suitable conventional thermoplastic material.

This platform embodiment F is advantageous from the standpoint that it is relatively inexpensive to manufacture. It can be seen from FIG. 16A that the base 266 is somewhat rectangular in top plan view so as to accommodate the thigh of a user. Since two separate wrist rests 252 and 254 are located on opposed legs of the deck 240, the platform F can be accommodated either on a user's right thigh, for right-handed users employing the wrist rest 252, or on a user's left thigh, for lefthanded users employing the wrist rest 254. In this embodiment of the invention, the deck 240 does not have to be rotated 180 degrees in order to accommodate both left and righthanded users.

Figure 17:
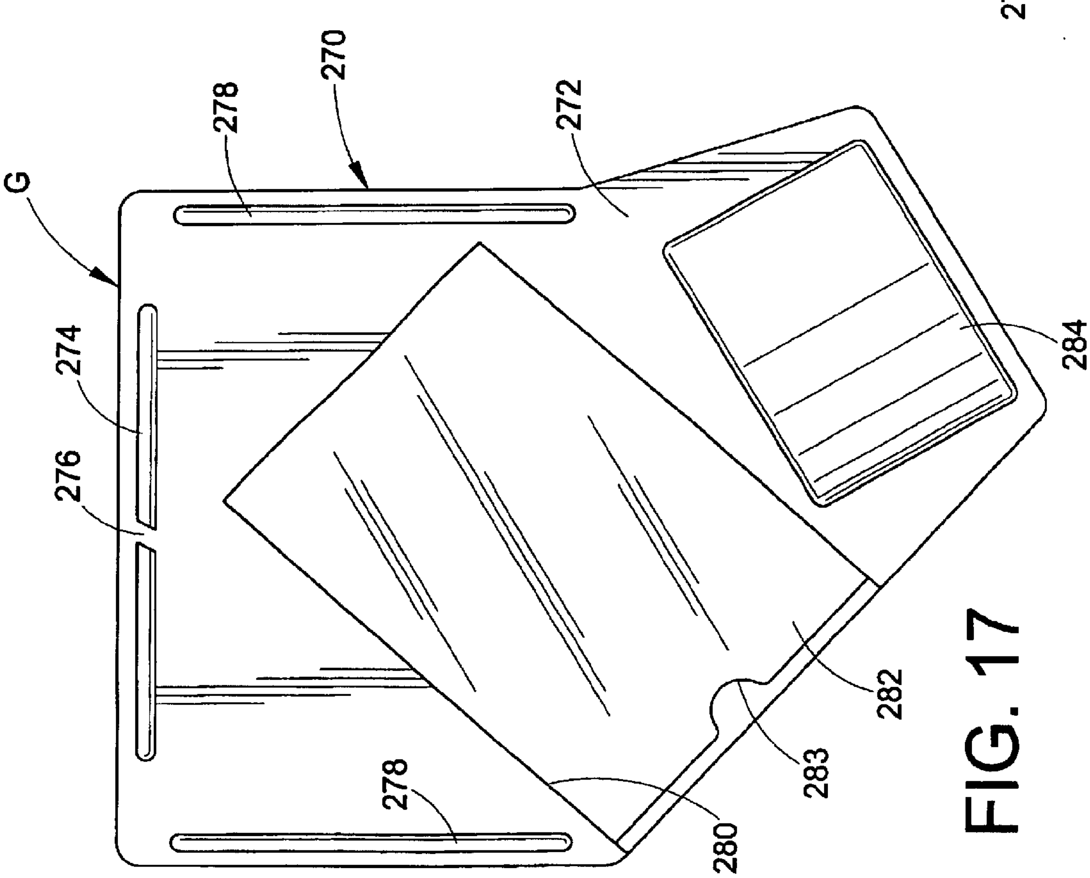
FIG. 17 is a top plan view of a platform according to a seventh embodiment of the present invention.

With reference now to FIG. 17, still a seventh type of platform G is there illustrated. This platform includes a deck 270 having a top surface 272 including a top rail 274 having a slot 276 therein. Also provided are a pair of side rails 278. The deck 270 further includes an indented section 280 along one side edge thereof. Overlying the indented section is a transparent cover 282 to form a pocket 283 accessible from the side of the deck. The pocket is useful for holding information, e.g. in the form of a card, on the deck 270. Such information can be, for example, a known grid sheet (not illustrated) on which a conventional light pen or optical mouse (not shown) can be moved. Also located on the deck top surface 272 is a wrist rest 284. The wrist rest can be permanently secured in place on, or of one piece with, the deck 270 if desired.

Figure 18:
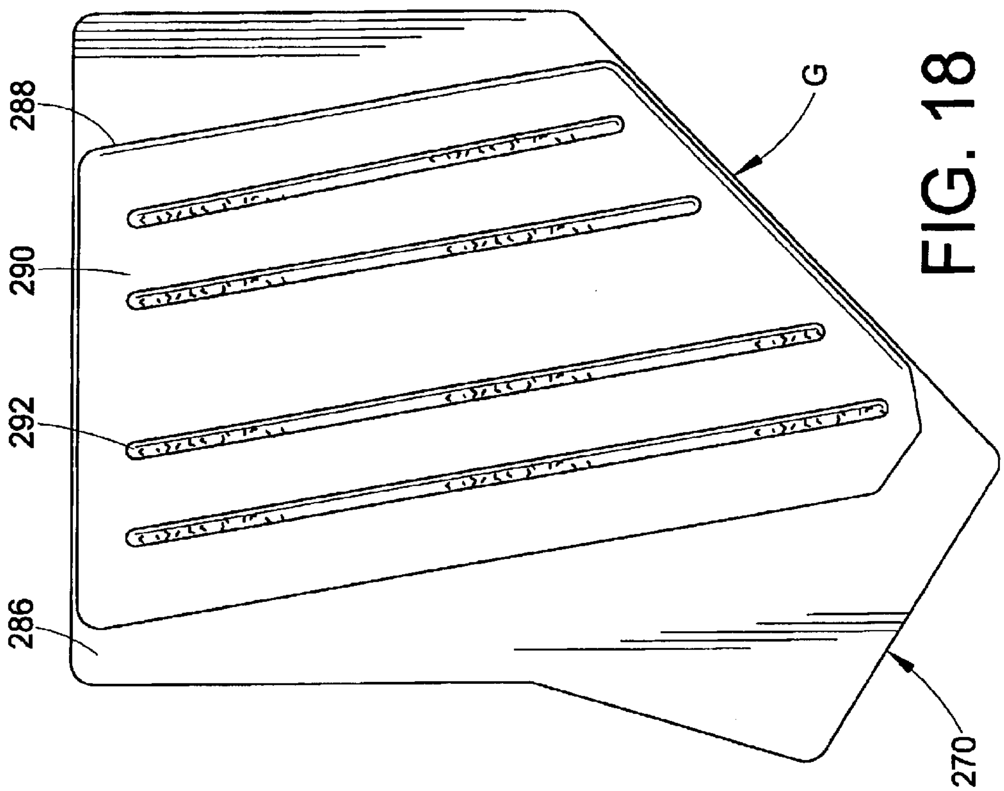
FIG. 18 is a bottom plan view of the platform of FIG. 17.

With reference now to FIG. 18, the deck 270 also includes a bottom surface 286 on which is located a base 288. The base can be permanently secured to the deck 270 if desired. In fact, the base can be of one piece with the deck such that the entire platform is manufactured in a single operation such as by injection molding or blow molding. The base 288 can have a concave lower surface 290. Located on the concave surface 290 are a plurality of longitudinally extending spaced ribs 292. These ribs have a friction generating surface in order to prevent a sliding of the base 288, and hence the platform G, on the thigh of a user.

The platform G is not reversible and is not meant for use by a lefthanded user. Rather, it is dedicated to a righthanded user and is meant to illustrate an embodiment of the invention which is inexpensive to manufacture.

Figure 20:
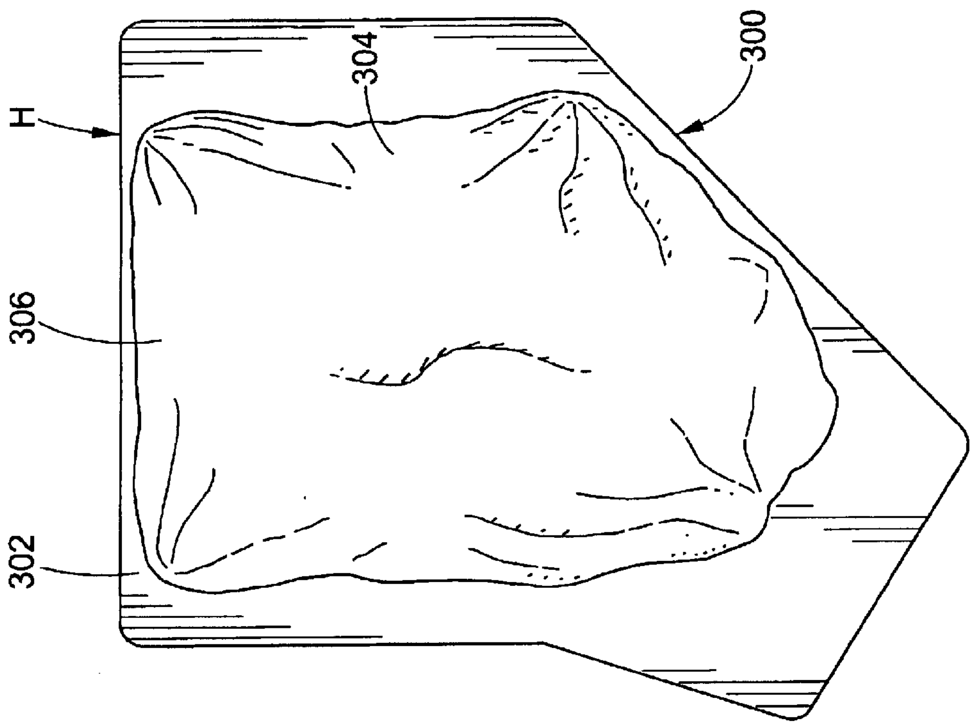
FIG. 20 is a bottom plan view of a platform according to an eighth embodiment of the present invention.

With reference now also to FIG. 20, a yet eighth type of platform H is there illustrated. This platform can be of a shape similar to the platform G illustrated in FIG. 18. However, the platform has a deck 300 with a lower surface 302 to which is secured a base 304. In this embodiment, the base can be in the form of a bag 306 which is partially filled with a suitable filling material so as to conform the base to the body contours of the user, such as, e.g., a beanbag type arrangement well known to the art. In this way, the platform H can be employed not only on the thigh of a user but also directly in the lap of the user as may be advantageous on certain occasions.

Figure 22:
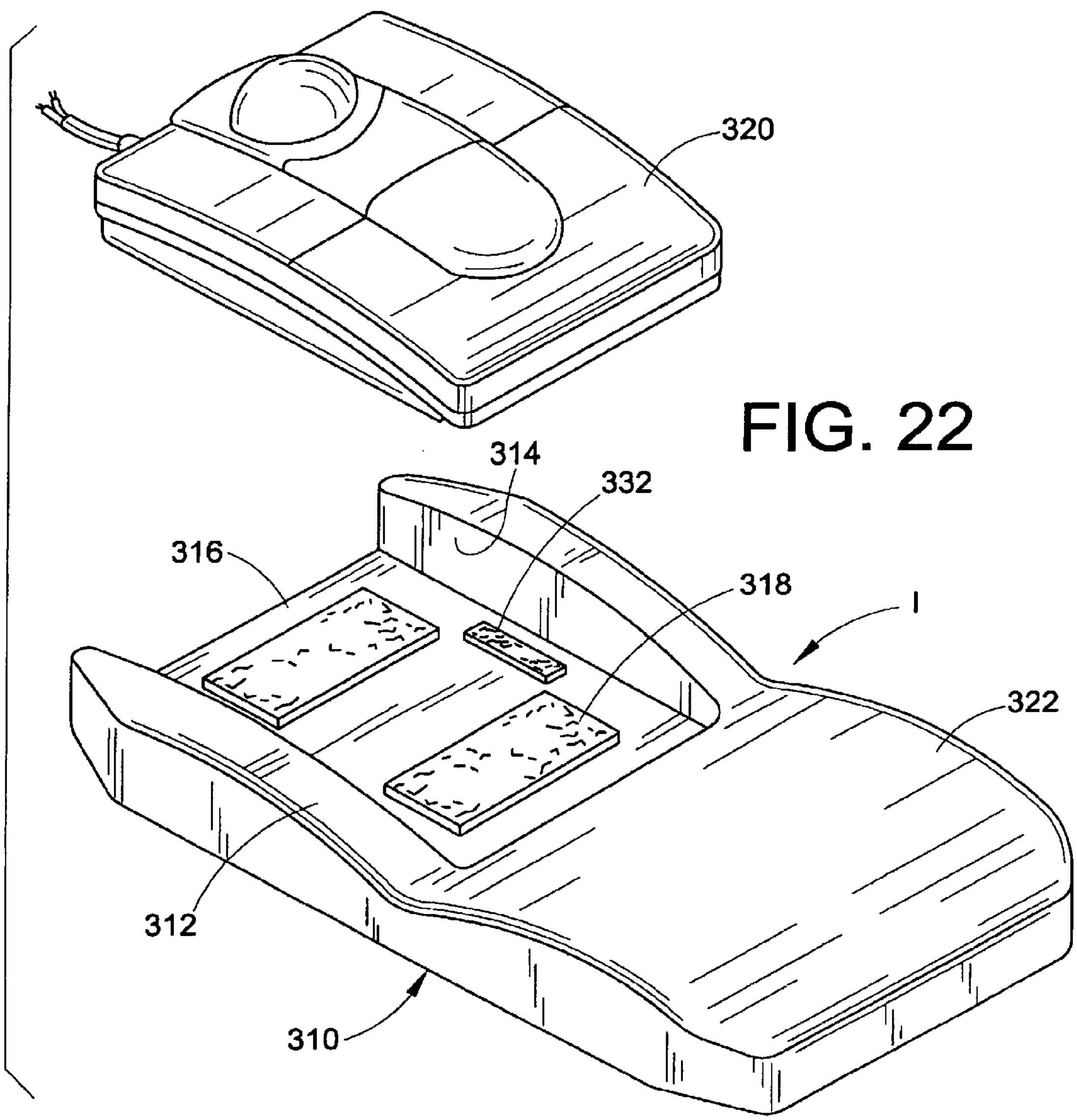
FIG. 22 is an exploded perspective view of a deck and a data input device, in the form of a track ball, of a platform according to a ninth embodiment of the present invention.

With reference now to FIG. 22, a ninth type of platform I for a computer input device is there illustrated. This platform includes a deck 310 having a top surface 312 in which is located a cavity 314. The cavity can open to one end surface of the deck 310 if desired. Located on a bottom surface 316 of the cavity is at least one large rectangular hook and loop strip 318. This strip can cooperate with a suitable strip (not illustrated) of hook and loop material located on the bottom surface of a conventional track ball 320 in order to secure the track ball in the cavity 314. The deck 310 can also include a contoured wrist rest portion 322. As can be seen from FIG. 22, the deck top surface 312 comprises a pair of convex surfaces. The first one includes the cavity 314 which accommodates the track ball 320 and the second one comprises the wrist rest portion 322.

Figure 23:
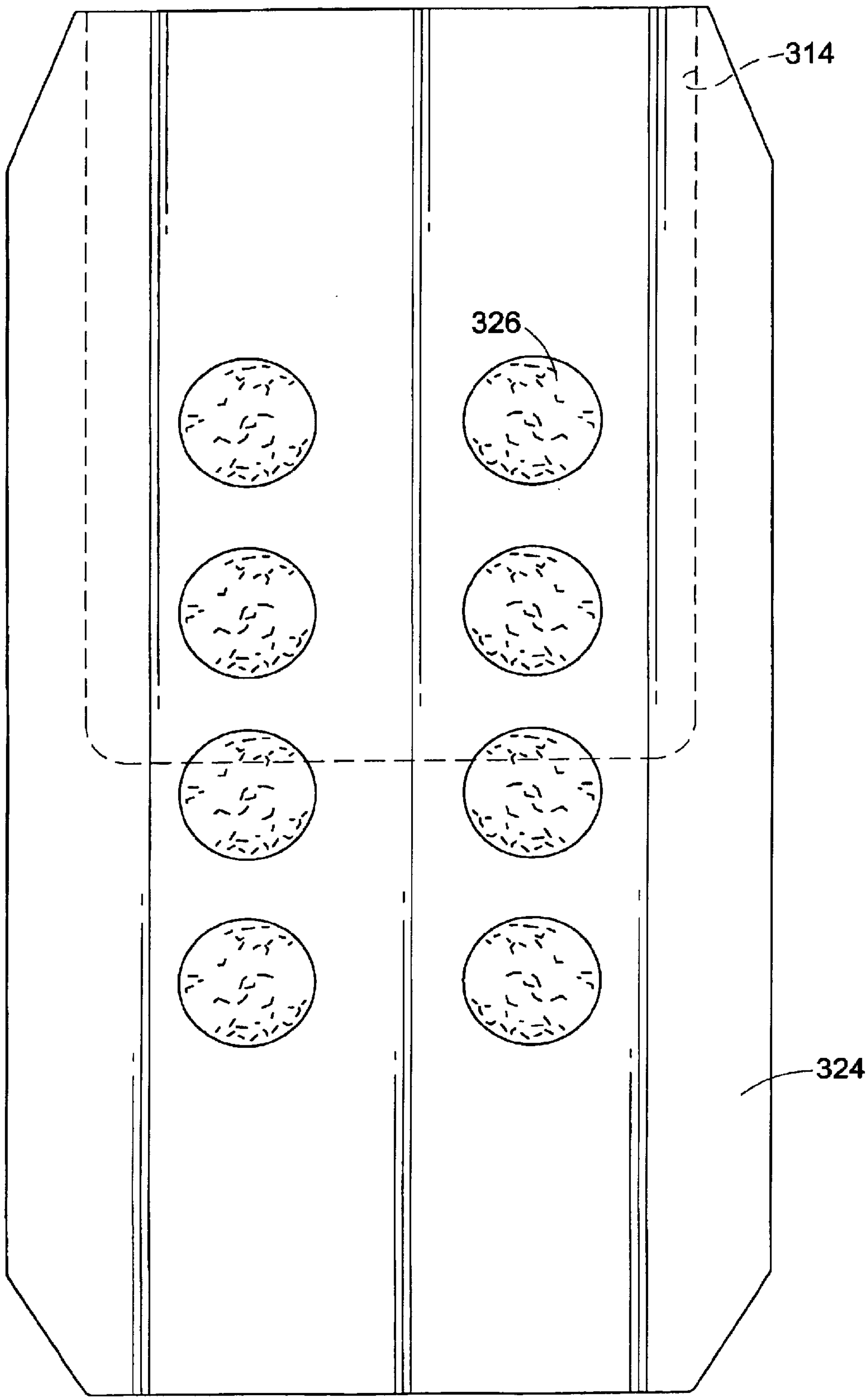
FIG. 23 is a bottom plan view of the deck of FIG. 22.

With reference now also to FIG. 23, the deck includes a planar bottom surface 324 on which are located a plurality of hook and loop disks 326. These disks enable the deck 310 to be selectively fastened to a suitable base such as, e.g., the base 50 illustrated in FIG. 1 of the drawings.

Figure 24:
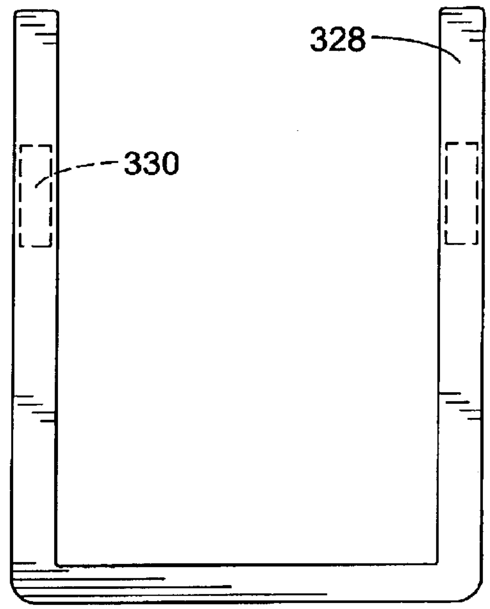
FIG. 24 is a top plan view of an insert meant to be selectively secured in a socket of the deck of FIG. 22 in order to accommodate a track ball of a smaller size.

The cavity 314 of the deck 310 is large enough to accommodate the largest width and length dimensions of the conventional track balls manufactured by the several suppliers of same. In order to allow the deck 310 to also accommodate narrower track balls, an insert 328 is provided as is illustrated in FIG. 24. The insert is of a substantially U-shaped nature and includes on a bottom surface of its pair of spaced legs, hook and loop strips 330. These cooperate with hook and loop strips 332 located adjacent the side edges of the cavity 316. In this manner, the insert 328 can be selectively secured in the cavity 316.

Figure 25:
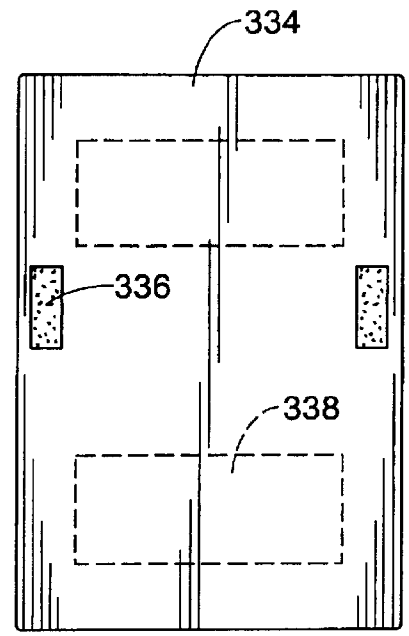
FIG. 25 is a top plan view of a spacer which is meant to be used in the socket of the deck of FIG. 22 in order to accommodate a thinner track ball.

In order to accommodate track balls which are not as high as the track ball 320, a planar spacer 334, as shown in FIG. 25, can also be provided. The spacer would have on one surface thereof a pair of spaced hook and loop strips 336 along the side edges for cooperation with the hook and loop strip 332 illustrated in FIG. 22. Located on another surface of the spacer 334 would be suitable hook and loop strips 338 much along the lines of the strips 318 illustrated in FIG. 22. The strips 338 would cooperate with suitable hook and loop strips located on the bottom surface of the track ball to secure the track ball in the deck.

Figure 26:
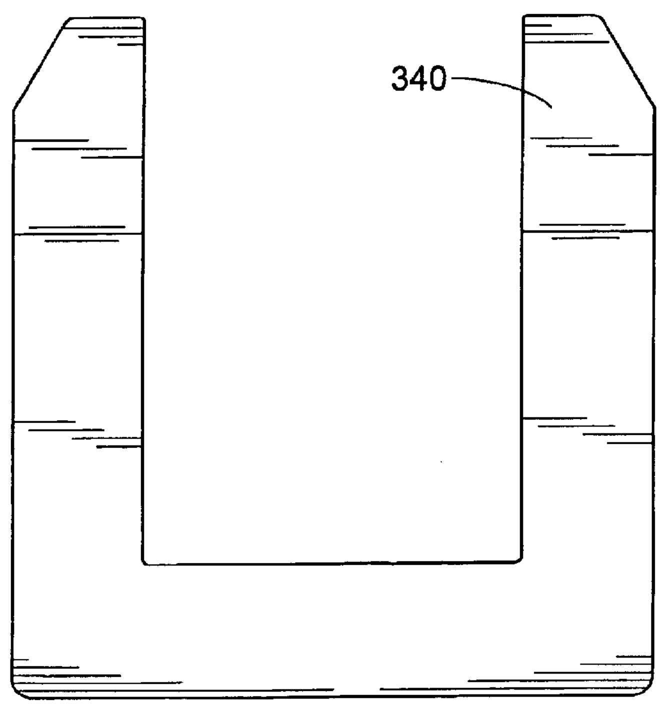
FIG. 26 is a top plan view of a spacer meant to be used with the deck of FIG. 22 in order that the platform can accommodate a thicker track ball.

With reference now also to FIG. 26, if the track ball were higher than the depth of the cavity 316, a collar 340 could be selectively secured to the top surface 312 of the deck 310 around the cavity 314. It should be evident from the instant disclosure that the collar 340 could be suitably secured to the deck by hook and loop fastener strips of the types illustrated in FIGS. 24 and 25.

Figure 27:
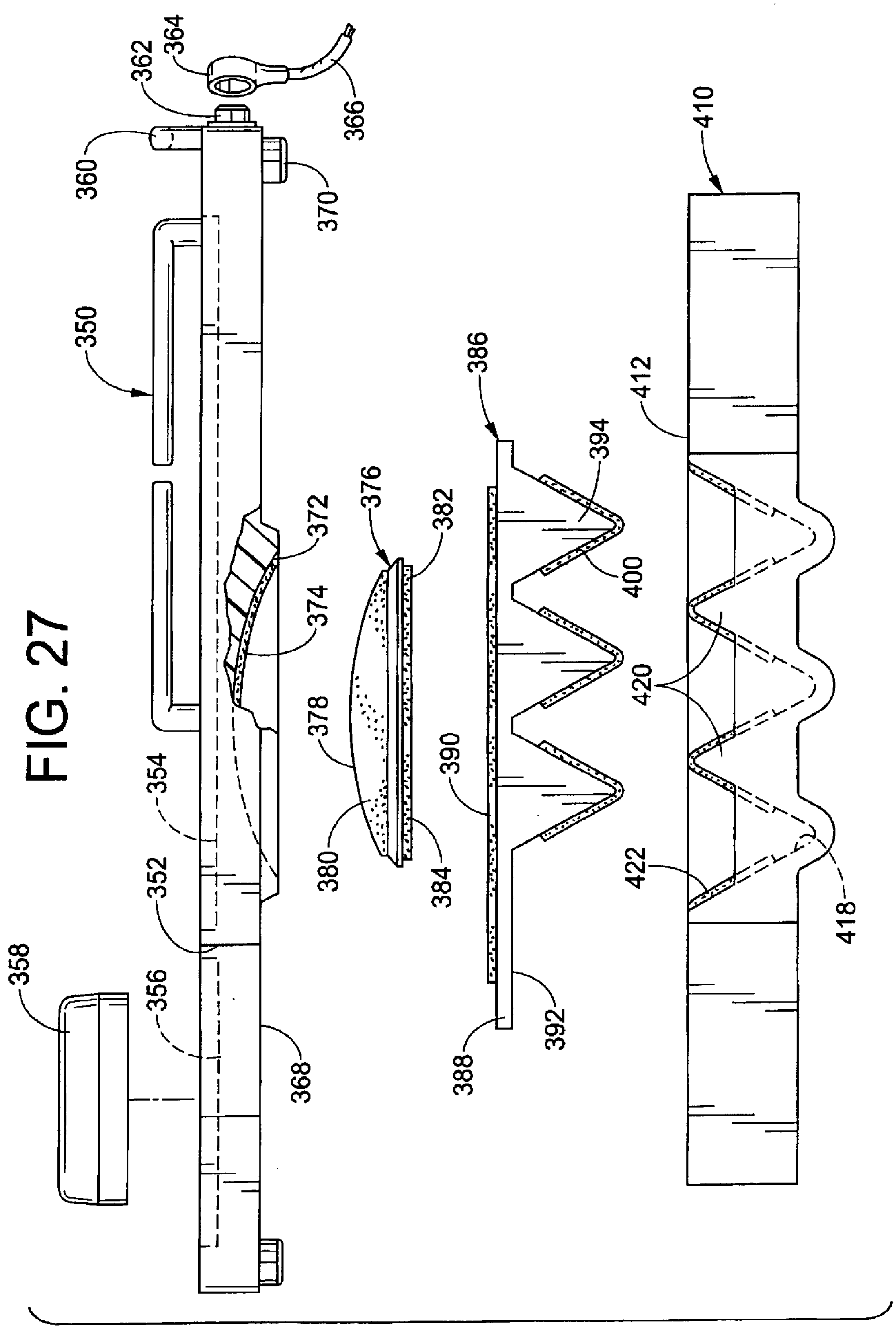
FIG. 27 is an exploded side elevational view, partially in cross-section, illustrating a platform according to a tenth embodiment of the present invention.

With reference now also to FIG. 27, a tenth type of platform J for a computer input device is there illustrated. This platform comprises a deck 350 having a top surface 352 including a first indented section 354, meant to accommodate a conventional mouse pad (not illustrated), and a second indented section 356 meant to accommodate a wrist rest 358. The wrist rest 358 can be slideable in relation to the deck 350 as in the embodiment illustrated in FIG. 12. Preferably, one or more rails 360 are located adjacent the edges of the top surface 352 to form a confining means for the data input device as discussed with regard to previous embodiments. Located along a front edge of the deck 350 is a first metallic snap 362. This snap is meant to selectively cooperate with a second metallic snap 364. The second snap is electrically connected by a wire 366 to a suitable ground. The user can, by touching the snap 364, dissipate any static electricity thereby avoiding the conduction of such static electricity to the data input device and hence to the circuitry of the computer or other device with which the input device is used.

Figure 32:
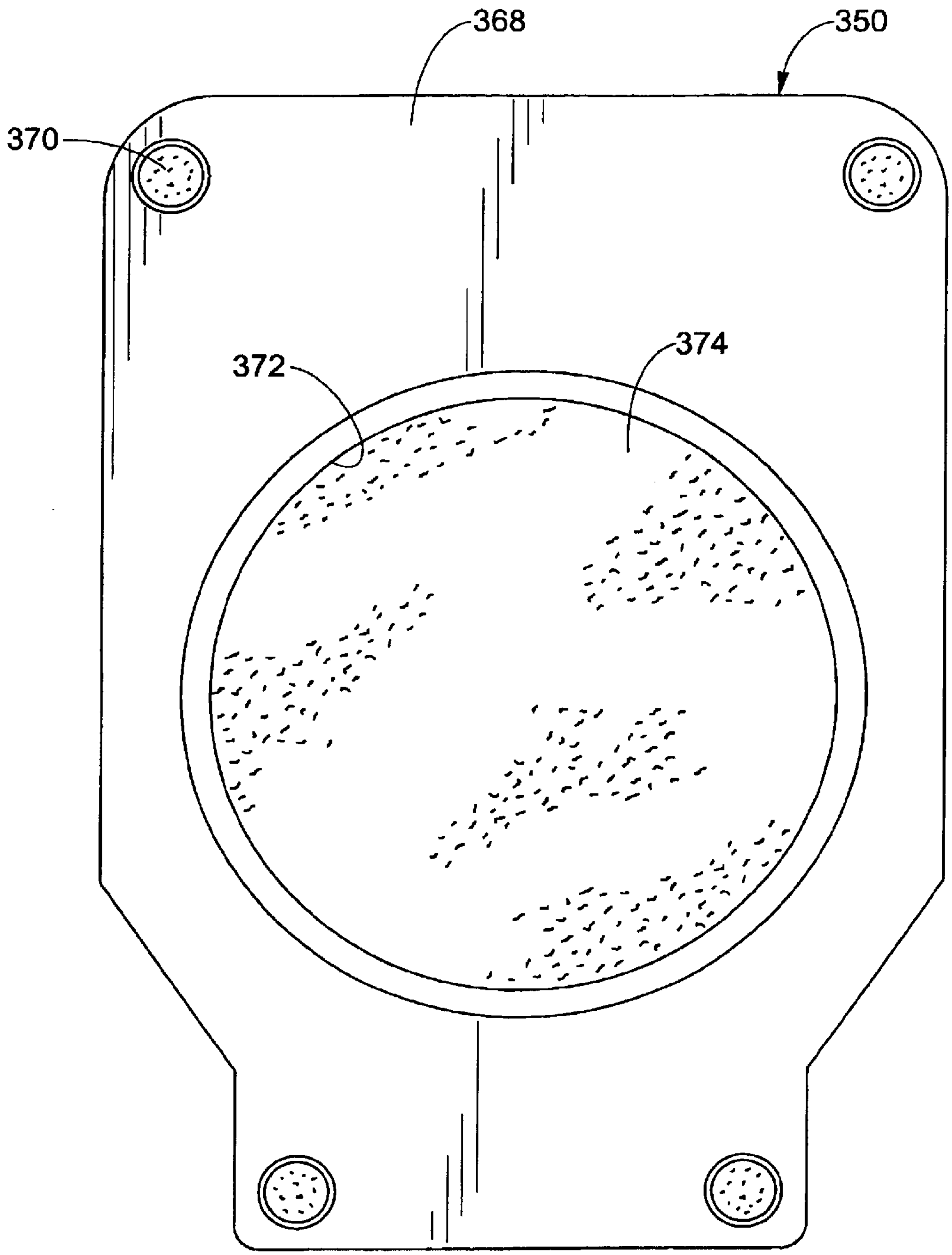
FIG. 32 is a bottom plan view of a deck of the platform of FIG. 27.

With reference now also to FIG. 32, a bottom surface 368 of the deck 350 is provided with a plurality of spaced feet 370. Located on the bottom surface is a concave section or socket 372 to which is secured a disk 374 of hook and loop material. The location of the socket 372 is roughly under the heel of the hand of the operator of an input device supported on the deck 350.

Figure 29:
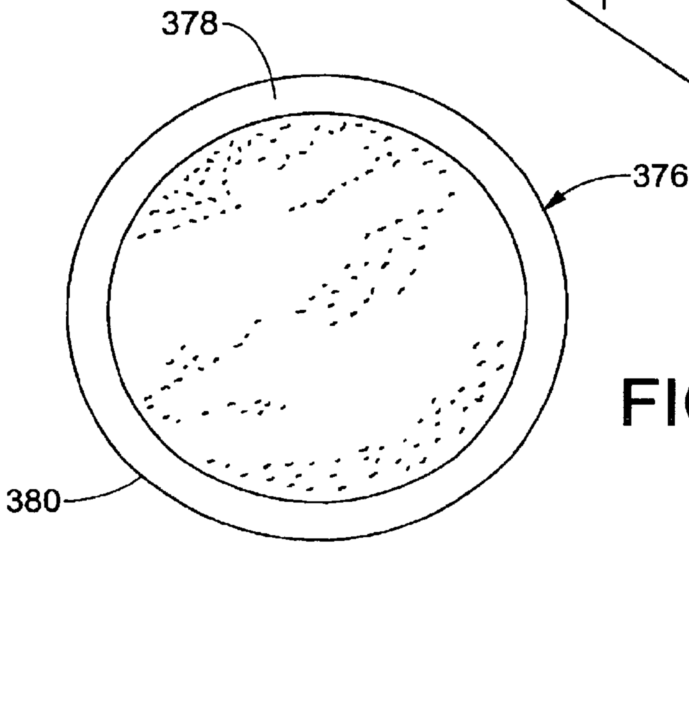
FIG. 29 is a top plan view of a first intermediate member or ball of the platform of FIG. 27.
Figure 30:
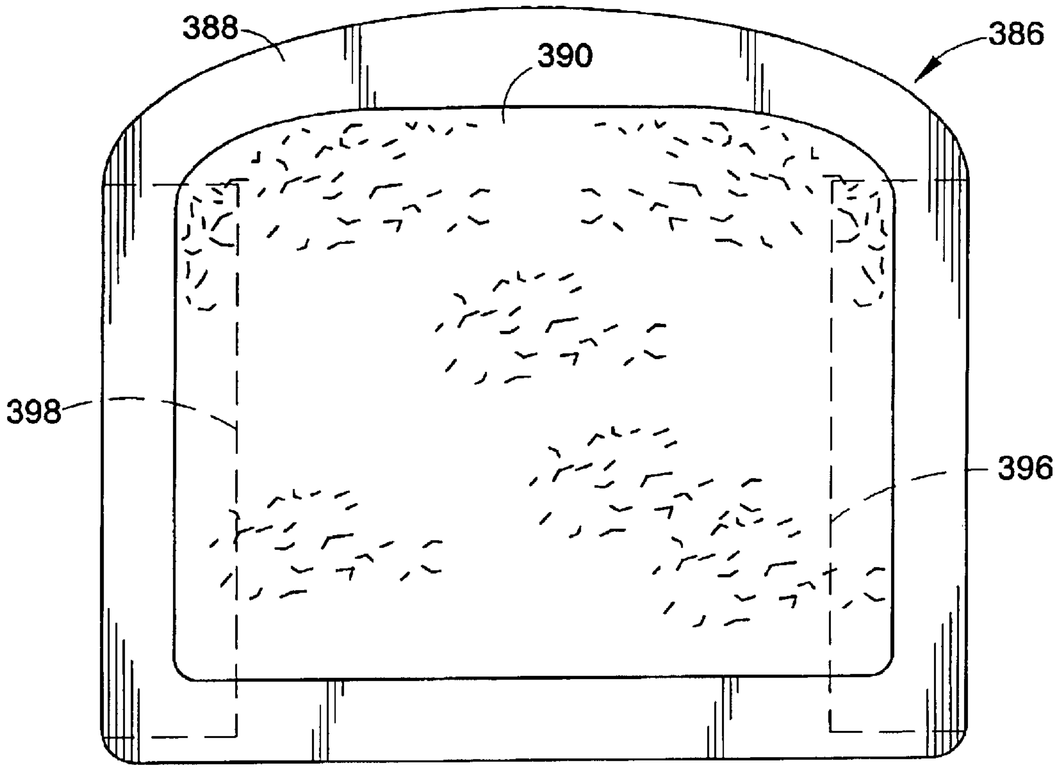
FIG. 30 is a top plan view of a second intermediate member of the platform of FIG. 27.

With reference now also to FIG. 29, a first intermediate member or ball 376 is meant to cooperate with the deck 350. The first intermediate member 376 includes a convex top surface 378 to which is secured a disk 380 of hook and loop material. The ball 376 can be selectively accommodated in the socket 372 such that the disk 380 cooperates with the disk 374. As shown in FIG. 27, the first intermediate member also has a bottom surface 382 on which is located a pad 384 of hook and loop material.

Cooperating with the first intermediate member 376 is a second intermediate member 386. The second intermediate member includes a planar top surface 388 having thereon a large patch of hook and loop material 390. The patch 390 is meant to cooperate with the pad of hook and loop material 384 on the bottom face of the first intermediate member. In this way, the first intermediate member can be secured both to the deck 350 and to the second intermediate member 386 at a desired location. In essence, a ball and socket joint is provided between the deck 350 and the second intermediate member 386.

This structure enables the angular orientation of the deck 350 to be changed in relation to a longitudinal axis of the second intermediate member 386. That is, the deck can be inclined in relation to the second intermediate member in a direction transverse to a longitudinal axis of the deck. In aeronautical terms, the roll of the deck can be adjusted. Thus, the deck can be tilted to one side or the other in the same manner as in the tilt of the deck illustrated in FIG. 9. In addition, the deck 350 can be inclined forwardly or rearwardly in relation to a horizontal plane extending through the second intermediate member 386. Thus a pitch of the deck as well as its roll can be adjusted as desired. Furthermore, such a ball and socket construction allows one to also adjust the yaw, or rotational orientation, of the deck in relation to a vertical axis passing through the second intermediate member. Such tilting, inclination and rotation of the deck is accomplished by aligning the first intermediate member in relation to the deck as desired and then securing these two elements together by their cooperating hook and loop disks 374 and 380. Then the first intermediate member can be secured in a desired location on the second intermediate member by the cooperation of the adjacent hook and loop surfaces 382 and 390.

Figure 31A:
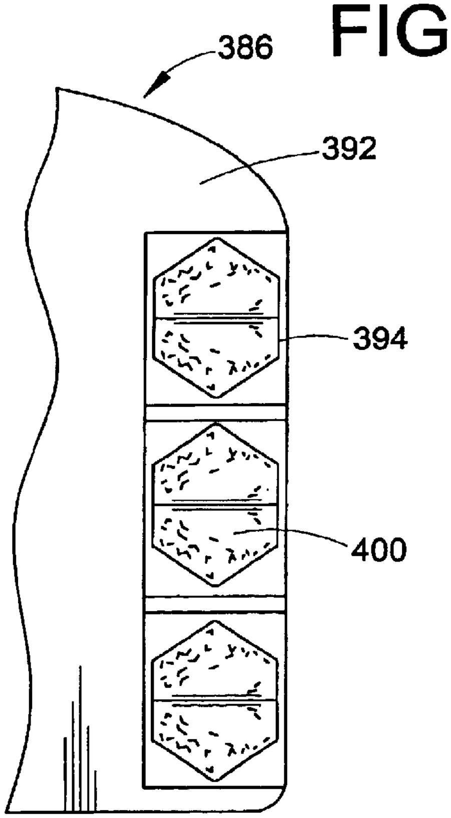
FIG. 31A is an enlarged fragmentary bottom plan view of the intermediate member of FIG. 30.
Figure 31B:
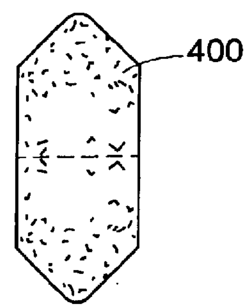
FIG. 31B is an enlarged top elevational view of a hook and loop fastener strip shown in the fragmentary view of FIG. 31A.

With reference now also to FIG. 31A, a bottom surface 392 of the second intermediate member 386 is provided with a plurality of tooth-like extensions 394 along its first and second side edges 396 and 398. Each of these tooth-like extensions 394 is covered with a strip of hook and loop material 400 in the form of a flattened hexagon as illustrated in FIG. 31B. Since the material 400 is draped over the tooth-like extension, the material assumes the form, in bottom plan view, of a somewhat regular hexagon as is illustrated in FIG. 31A.

Figure 28:
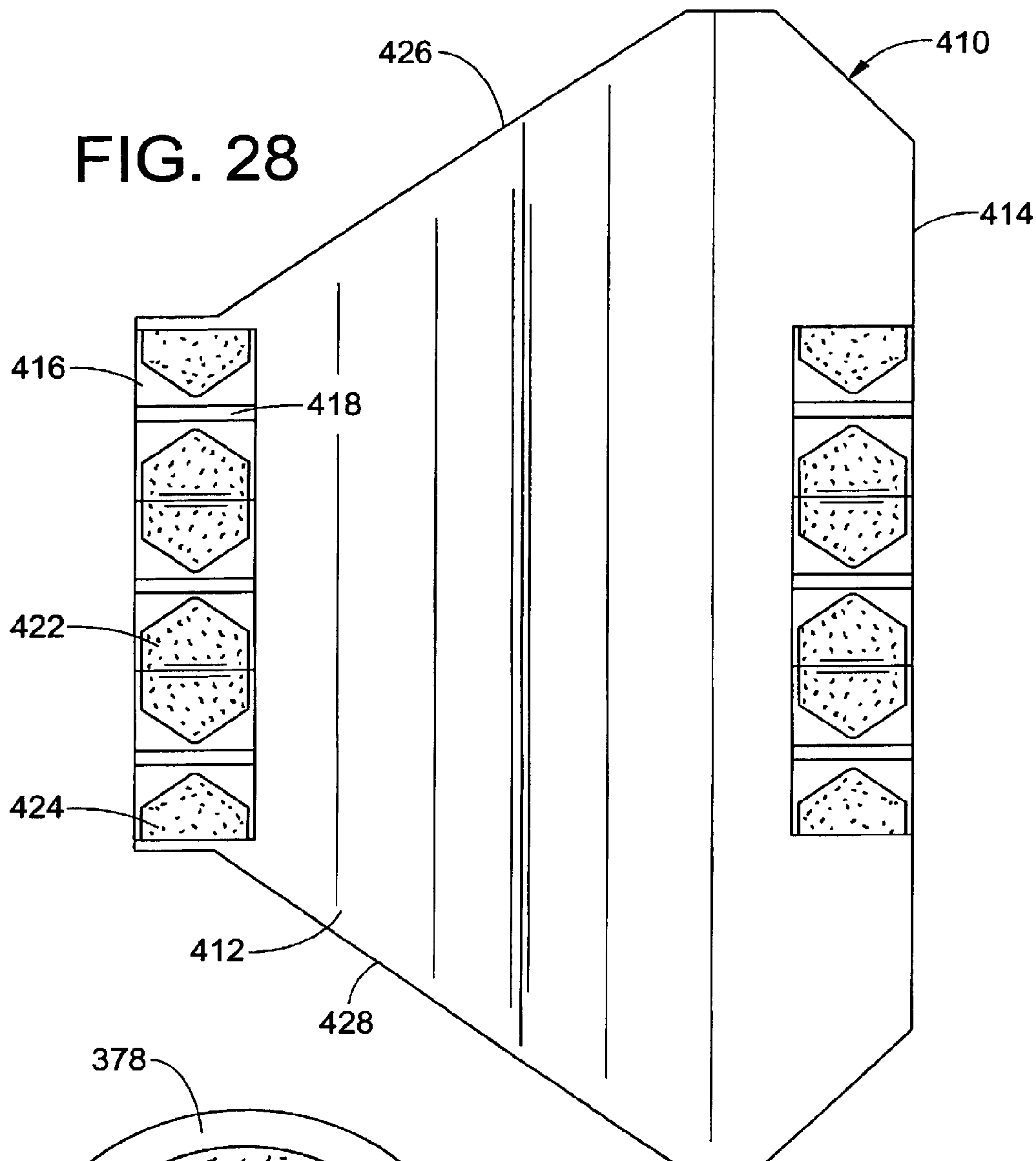
FIG. 28 is a top plan view of a base of the platform of FIG. 27.

The second intermediate member 386 can be selectively secured to a deck 410 as shown in FIG. 27. With reference now also to FIG. 28, the deck 410 includes a top surface 412. Located in the top surface 412 along the first and second side edges 414 and 416 of the deck are a plurality of spaced sockets 418. The sockets are so spaced from each other as to form a pair of teeth 420 between the three sockets as can be best seen in FIG. 27. Draped over the two teeth 420 are a pair of hook and loop strips 422 having a substantially hexagonal shape. Each strip of material 422 has substantially the same shape as the strip 400 illustrated in FIG. 31B. Located on the two opposing surfaces of the forwardmost and rearmost sockets 418 are a pair of substantially pentagonally shaped strips 422 of hook and loop material.

The strips of hook and loop material 400 on the bottom face of the second intermediate member 386 cooperate with the strips of hook and loop material 422 and 424 on the top face of the base 410 for selectively fastening the second intermediate member at a desired level in the sockets 418 of the base 410. It should be appreciated that the second intermediate member can thus be moved toward and away from the base 410. This structure, therefore, comprises a second positioning means for raising and lowering the deck 350 in relation to the base 410.

As shown in FIG. 28, the base 410 can also have first and second bevelled edges 426 and 428. This construction of the base is advantageous for the same reasons as described previously with regard to the base 50 of FIG. 1.

Figure 33:
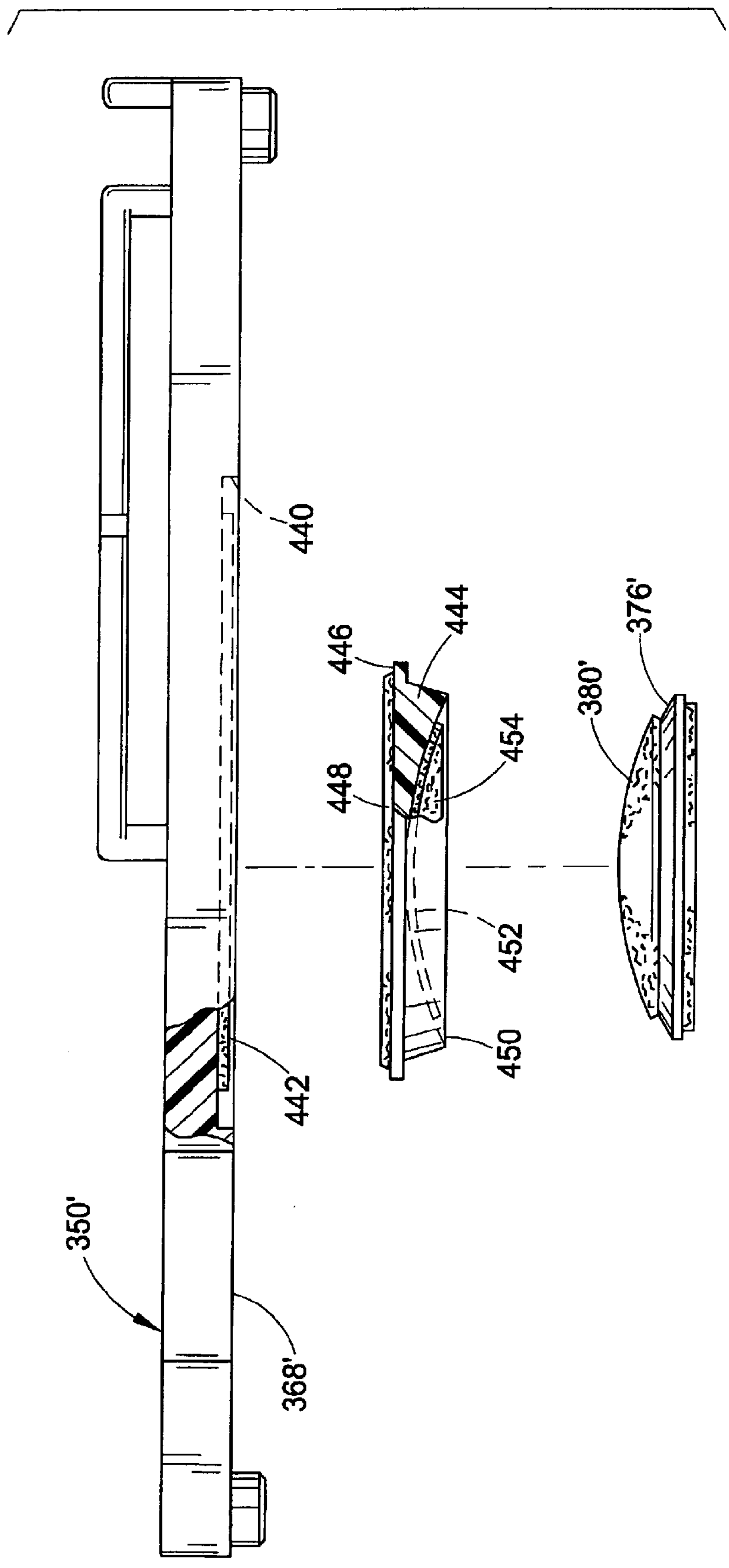
FIG. 33 is a side elevational view, partially in cross-section, of an alternate ball and socket construction for the platform of FIG. 27.

With reference now also to FIG. 33, a modified version of the deck of FIG. 27 is there illustrated. For ease of appreciation and understanding of this modification, like components are identified by like numerals with a primed (') suffix and new components are identified by new numerals. In this embodiment, a deck 350' includes a bottom surface 368' in which is located an indented portion 440. Located in the indented portion is a layer 442 of a hook and loop material. Cooperating with the deck 350' is a third intermediate member 444. This member has a planar top surface 446 on which is located a strip of hook and loop material 448. The third intermediate member 444 also includes a bottom surface 450 in which is located a concave surface or socket 452 covered by a disk 454 of a hook and loop material. The disk 454 is meant to cooperate with a disk 380' of hook and loop material located on a convex top surface of a first intermediate member 376'.

FIG. 33 illustrates an embodiment in which the means for adjusting the pitch, roll and yaw of the deck on the base can be selectively utilized by employing the first and third intermediate members 376' and 444. In the adjustable version illustrated in FIG. 33, the third intermediate member 444 can be selectively secured in a desired location on the bottom surface of the deck 350' so as to promote the balance of the unit on the user's thigh. Alternatively, these elements can be eliminated and the deck 350' can be simply secured in a horizontal orientation on a suitable base such as the base 50 illustrated in FIG. 1 of the drawings.

Figure 34:
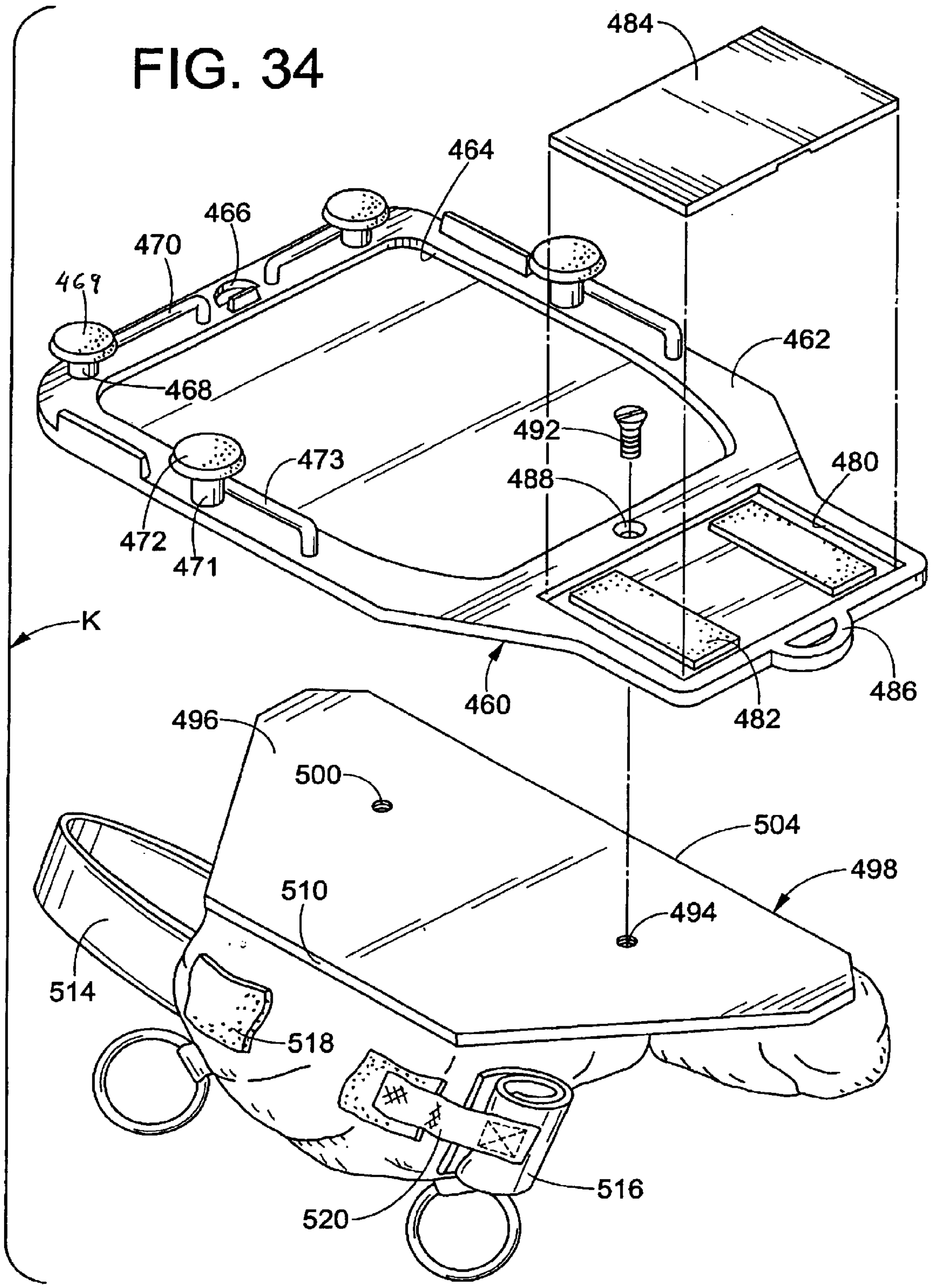
FIG. 34 is an exploded perspective view of a platform according to an eleventh embodiment of the present invention.

With reference now to FIG. 34, a yet eleventh type of platform K for a computer input device is there illustrated. This platform comprises a deck 460 having a top surface 462 in which is located a first indented section 464 for accommodating a suitable mouse pad. Extending through the deck is a first opening 466.

Figure 35:
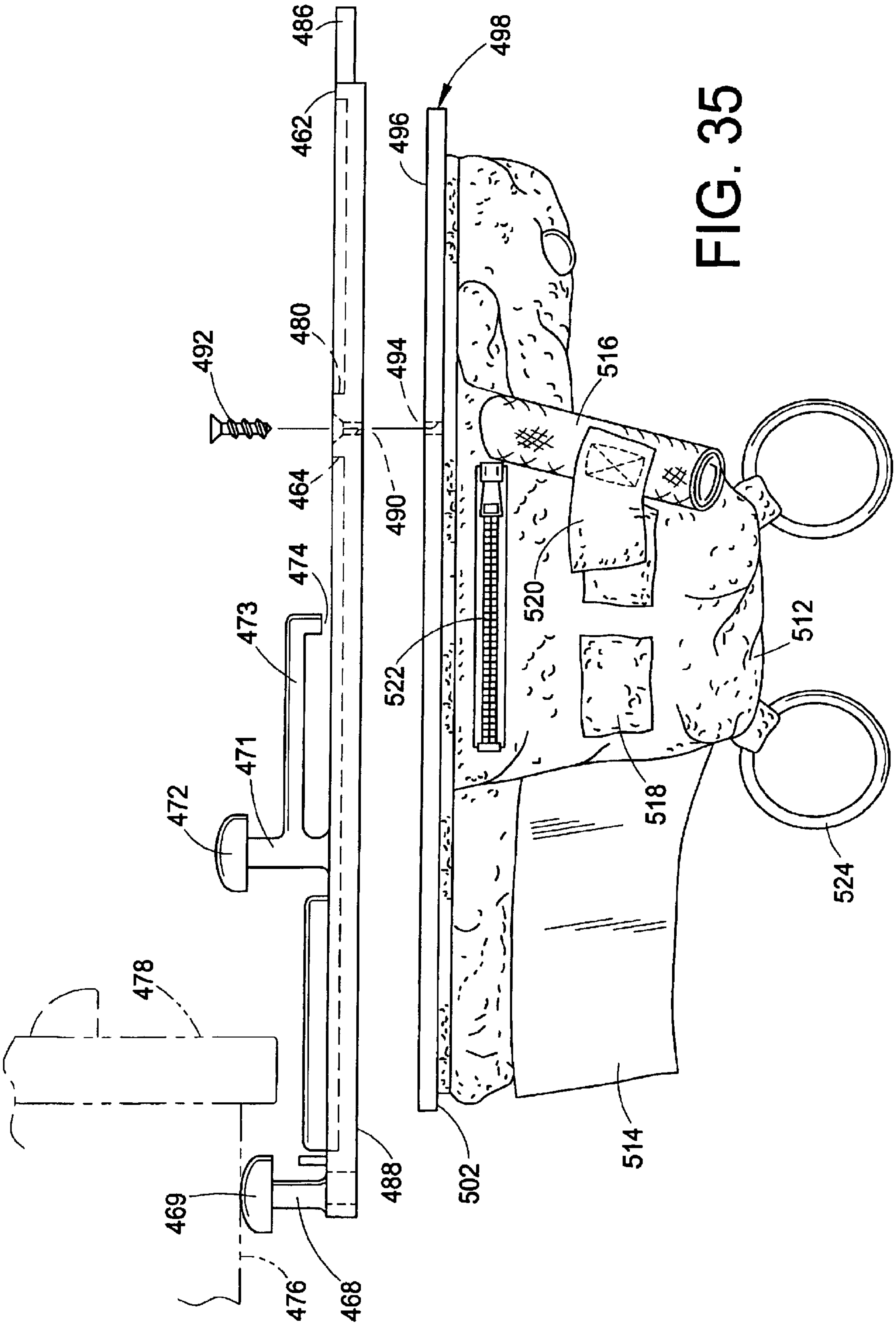
FIG. 35 is an exploded side elevational view of the platform of FIG. 34.

With reference now also to FIG. 35, extending upwardly from the deck top surface, on each side, are a pair of forward stems 468 each terminating in a mushroom-shaped forward head 469. This may be covered by a rubber cap if desired. Extending radially away from each stem is a spigot-like arm 470. Also provided are a pair of second stems 471, one along each side surface of the deck. These stems are longer than the stems 468 as is evident from FIG. 35. Each of these terminates in a mushroom-shaped head 472. Extending radially away from each stem is an arm 473 that terminates above the deck top surface to form an opening 474. This opening accommodates the control wire of a suitable data input device such as a mouse or a track ball.

The forward head 469 can cooperate with, and be stabilized by, a desk or other conventional work surface. More specifically, each forward head 470 is meant to contact a bottom surface 476 of the desk and be wedged behind, for example, a desk drawer 478 or a slide-out keyboard tray such as is known in the art. In this way, the platform K provides an additional work surface that is rigidly positioned in relation to a large work surface. Yet by movement of the user's leg, the entire platform can be shifted so as to be comfortable for a user, or removed if not needed. The side stems 471 are taller so that the mushrooms 472 prevent the deck 460 from sliding underneath the desk bottom surface 476 when the user is seated close in.

Also located on the deck top surface 462 is a second spaced indented section 480 which contains therein a pair of spaced hook and loop strips 482. The second indented section is meant to accommodate a suitable wrist rest such as the wrist rest 30 illustrated in FIG. 1. On the other hand, if a wrist rest is not desired, the indented section 480 can be filled by a plug 484 which has on its bottom surface suitable hook and loop strips (not illustrated) so as to adhere the plug in place to the strips 482. Located adjacent the second indented section 480 is a loop 486 which can be of one piece with the deck 460. This loop is advantageous for allowing the deck, and indeed the entire platform, to be secured from a suitable hook or the like (not illustrated) fastened adjacent the work area in which the platform is used.

Extending through the deck 460 from the deck top surface 462 to a deck bottom surface is an aperture 488. Selectively securable in the aperture is a fastener 492. The fastener extends into a threaded aperture 494 in a top surface 496 of a base 498. As is evident from FIG. 34, two spaced threaded apertures 494 and 500 are provided. In this way, the deck 460 can be secured in either of two 180 degree reversed positions so as to allow the user to employ the deck 460 in either a righthanded or a lefthanded configuration on, respectively, his right thigh or his left thigh. In this embodiment, however, the means for securing the deck 460 to the base 498 is the fastener 492 and the cooperating apertures 488, 494 and 500. One advantage to the provision of a fastener 492 is that the deck 460 can be made to swivel in relation to the base 498 around the fastener if so desired.

Figure 36:
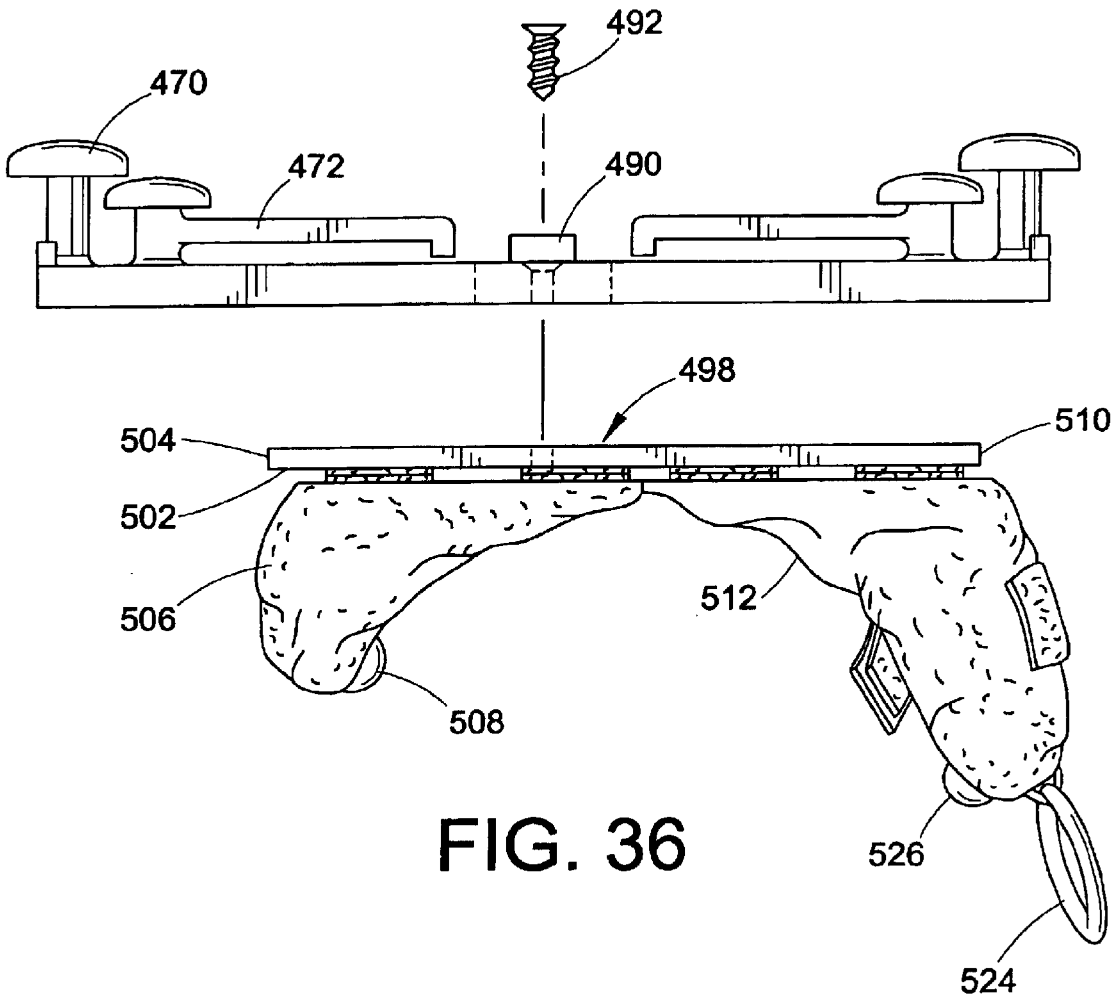
FIG. 36 is an exploded end elevational view of the platform of FIG. 34; and, FIG. 37 is an exploded end elevational view of a wrist rest which can be used alternatively with the platforms illustrated in FIGS. 1, 13, 27 and 34.

With reference now also to FIG. 36, the base 498 also includes a bottom surface 502. Secured adjacent a first edge 504 of the bottom surface 502 is a first bag 506. The bag 506 can be fastened to the base bottom surface 502 by hook and loop fasteners of the type previously illustrated. Alternate means of securing the bag to the base are, of course, also known. The bag 506 is filled with a suitable conventional particulate fill or ballast material so as to allow the bag to conform itself to the body shape of the user, such as in the well known beanbags and the like. Located on an inner surface of the first bag 506 are one or more knobs 508 which provide a means for frictionally retarding longitudinal movement of the base 498 on a user's thigh.

Located adjacent a second edge 510 of the base 498 is a second bag 512. It is evident from FIG. 36 that the second bag 512 is considerably deeper than the first bag 506. This construction enables the second bag 512 to have more weight in order to shift the center of gravity of the deck towards the inside of the user's thigh. With reference again to FIG. 35, this bag includes a pair of wings 514 and 516. Only one of these wings is meant to be used at one time. The purpose for the wings is to equalize the amount of weight which is borne along the two side edges 504 and 510 of the base 498 and in this way prevent the base from tipping outwardly, i.e. towards its first edge 504. For example, in the configuration illustrated in FIG. 34, the base 498 is meant to be employed on the right thigh of the user. Therefore, the first wing 514 is shown as being filled with the fill material whereas the second wing, i.e. the one adjacent the groin of the user, is shown as being rolled up.

On the other hand, if the base 498 were reversed, then the first wing 514 would be rolled up and the second wing 516 would be unrolled. In order to secure the wings in a rolled up condition, spaced first and second hook and loop strips 518 are secured on the main bag portion 512. These are meant to cooperate with tabs 520 which are fastened to each of the wings. Each tab includes on one surface thereof a suitable hook and loop strip of material so as to cooperate with the hook and loop strip 518. As shown in FIG. 35, a zipper 522 is provided in the second bag 512. This allows the user to either add or remove ballast material so that the second bag is of the desired fullness for the user. Located along a bottom surface of the second bag 512 are a pair of rings 524. These may be used to support items from the bag if desired. Alternatively, the rings can be utilized to hang the base 498 from a suitable support hook or the like. One or more knobs 526, which face the leg of the user and the one or more knobs 508 on the first bag 506, are provided on the second bag 512 so as to increase the friction between the deck and the user's leg in order to retard the platform from sliding thereon.

Figure 37:
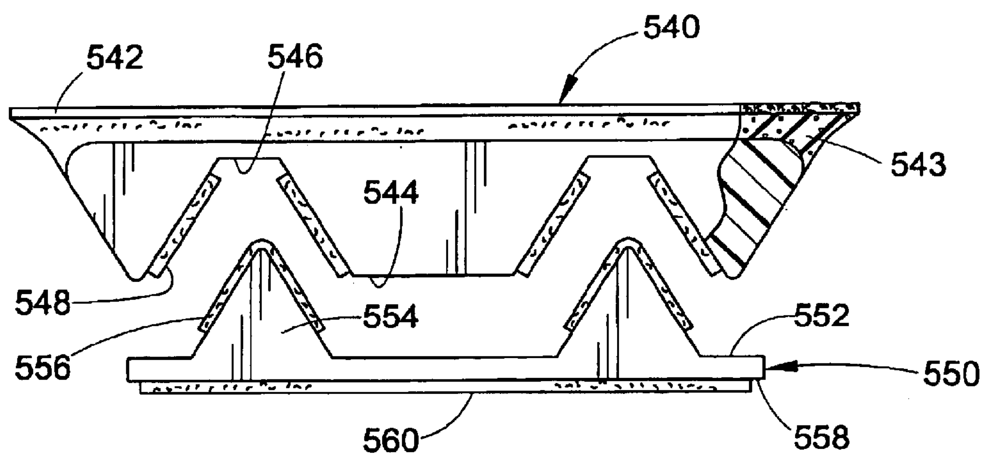

With reference now to FIG. 37, a height adjustable wrist rest is there illustrated. This wrist rest construction comprises an upper element 540 having a top surface 542 which may be contoured as desired for the user's wrist. As shown in partial cross-section, the wrist rest upper element top surface 542 can be made of a cloth material under which is positioned a resilient elastomeric layer 543. Beneath the elastomeric layer is a harder plastic material which extends down to a bottom surface 544 of the upper element 540. The wrist rest is thus padded. Provided in the bottom surface are a pair of spaced sockets 546. Secured along opposing socket faces are strips 548 of a hook and loop material.

The upper element 540 is meant to cooperate with a lower element 550 having an upper surface 552 on which are formed a pair of spaced projecting teeth 554. Draped atop each of these teeth is a suitable strip of a hook and loop material 556. These strips of material may be of the same flattened hexagonal shape as discussed previously with regard to the embodiment illustrated in FIG. 31B. Located on a bottom surface 558 of the lower element 550 is a suitable swatch of hook and loop material 560. This material is meant to cooperate with the spaced strips of hook and loop material 482 illustrated in FIG. 34 of the drawings.

As may be appreciated from the discussion made with regard to the platform J, the teeth 554 can move vertically in relation to the sockets 546 so that the strips of cooperating hook and loop material 548 and 556 can be secured at the desired location with respect to each other. In this manner, the upper element 540 can be spaced vertically towards or away from the lower element 550 so that the desired height of the wrist rest is thereby obtained. This wrist rest construction can be used with many of the decks discussed above, such as the decks 10, 180 and 460.

The invention has been described with reference to a number of preferred embodiments. Obviously, modifications and alterations will occur to others upon the reading and understanding of this specification. It is intended to include all such modifications and alterations insofar as they come within the scope of the appended claims or the equivalents thereof.

I claim:

1. A platform for a hand-controllable data input device used with a microprocessor and an operator's extremity associated with controlling said data input device, wherein said platform is adapted to stably rest upon a thigh of the operator, said platform comprising:

a deck having a top surface, on which said data input device and the extremity can be selectively positioned, and a bottom surface;

a base having a top surface, and a bottom surface that is adapted to rest upon a thigh of the operator;

a fastening means for securing said deck bottom surface to said base top surface; and, wherein said base has a shape that is substantially trapezoidal so as to accommodate at least some of a lower trunk of the operator.

2. The platform of claim 1 wherein said base top surface is substantially rigid.

3. The platform of claim 1 further comprising a mouse pad and wherein said deck top surface further comprises an indented section for accommodating said mouse pad.

4. A platform for a computer mouse used with a microprocessor and an operator's extremity associated with controlling said mouse, wherein the platform is configured to stably rest upon a thigh of the operator, said platform comprising a support assembly including at least one piece and comprising:

a top surface, on which an associated mouse and the extremity can be selectively supported, wherein said top surface comprises a mousing surface upon which the associated mouse may stably rest and be used, said mousing surface being substantially planar;

a bottom surface, wherein said bottom surface comprises a concave portion for accommodating a thigh of the operator;

wherein said support assembly is configured so that said mousing surface can be stably oriented substantially parallel to a top surface of the operator's thigh while said platform is in operation;

wherein said support assembly top surface further comprises a first side edge, an end edge and a connecting edge for connecting the first side edge and the end edge, wherein said connecting edge defines with said first side edge and said end edge, an indented portion for accommodating at least some of a lower trunk of the operator, and wherein said connecting edge comprises a concave shape; and wherein said support assembly top surface further comprises a substantially closed aperture for restraining the associated mouse from falling to the floor while said platform is in use, wherein said aperture is located adjacent an edge of said support assembly top surface, wherein said aperture is adapted to accommodate a communications wire of the associated mouse.

5. The platform of claim 4 further comprising a wrist rest, said wrist rest being secured to said support assembly top surface, said wrist rest comprising a resilient material, wherein said wrist rest is located adjacent at least one of said end edge and said side edge.

6. The platform of claim 4 further comprising:

a storage means enabling the bottom surface of said support assembly to be selectively attached directly to an associated inanimate item other than the associated mouse when said platform is not in use, wherein said storage means comprises a fastener secured directly to said support assembly bottom surface.

7. A platform for a computer mouse used with a microprocessor and an operator's appendage associated with controlling said mouse, wherein the platform is configured to stably rest upon a thigh of the operator, said platform comprising a support assembly including at least one piece and comprising:

a top surface, on which the mouse and the appendage can be selectively supported, wherein said top surface comprises a surface that is substantially planar;

a bottom surface, wherein said bottom surface is adapted to rest upon a thigh of the operator;

wherein said support assembly top surface is configured so that said substantially planar surface can be stably oriented substantially parallel to a top surface of the operator's thigh while said platform is resting upon said thigh;

wherein said support assembly top surface comprises a first section of a first width and, extending therefrom in a plane of said first section, a second section of a narrower second width, wherein a top surface of said second section comprises two spaced edges that are substantially parallel to each other and wherein said second section is adapted to rest immediately adjacent a lower trunk of said operator.

8. The platform of claim 7 further comprising:

a friction element for retarding a sliding movement of the platform upon its subjacent supporting surface, said friction element being located on said support assembly bottom surface; and wherein a top surface of said first section comprises two spaced edges that are substantially parallel to each other.

9. The platform of claim 7 further comprising:

a friction means for retarding a sliding movement of the platform upon its subjacent supporting surface, said friction means being located on said support assembly bottom surface; and a substantially closed aperture for restraining said mouse from falling to the floor while said platform is in use, wherein said aperture is located adjacent an edge of said support assembly top surface and said aperture is adapted to accommodate a communications wire of said mouse.

10. A platform for a computer mouse used with a microprocessor and an operator's extremity associated with operating said mouse, wherein the platform is configured to stably rest upon a thigh of the operator, said platform comprising a support assembly including at least one piece and comprising:

a top surface, on which an associated mouse and the extremity can be selectively supported, wherein said support assembly top surface comprises a mousing surface upon which the associated mouse may rest and be operated, said mousing surface being substantially planar;

a bottom surface, wherein said bottom surface is adapted to rest upon a thigh of the operator;

wherein said support assembly is configured so that said mousing surface can be stably oriented substantially parallel to a top surface of the operator's thigh while said platform is resting upon said thigh;

wherein said support assembly top surface comprises a first side edge, and end edge and a connecting edge for connecting the first side edge and the end edge, wherein said connecting edge defines with said first side edge and said end edge, an indented portion for accommodating at least some of a lower trunk of the operator, and wherein said connecting edge comprises a concave shape; and, wherein said support assembly further comprises a substantially closed aperture adapted to accommodate a communications wire of the associated mouse.

11. The platform of claim 10 further comprising:

a friction element for retarding a sliding movement of said platform upon the operator's thigh, said friction element being located on said bottom surface.

12. The platform of claim 10 further comprising:

a guardrail for keeping said mouse on said support assembly top surface, wherein said guardrail is mounted on said support assembly top surface and extends around at least some of a perimeter said support assembly top surface, wherein said substantially closed aperture is located in said guardrail; and a friction element for retarding a sliding movement of said platform upon said thigh, said friction element being located on said bottom surface.

13. The platform of claim 12 further comprising a storage means secured to said support assembly for enabling the bottom surface of said support assembly to be selectively attached directly to an associated inanimate item other than the associated mouse when said platform is not in use, wherein said storage means comprises a fastener attached directly to said support assembly bottom surface.

14. A platform for a computer mouse used with a microprocessor and an operator's extremity associated with controlling said mouse, wherein the platform is configured to stably rest upon a thigh of the operator, said platform comprising a support assembly including at least one piece and comprising:

a top surface, on which an associated mouse and the extremity can be selectively supported;

a bottom surface, wherein said bottom surface comprises a concave portion for accommodating a thigh of the operator and further comprises a friction element for retarding a sliding movement of said platform upon said thigh, said friction means being located on said bottom surface; and a wrist rest for supporting an operator's wrist and adjacent areas of the operator's extremity, said wrist rest being secured to said support assembly top surface, wherein said wrist rest is located adjacent a first edge of said support assembly top surface, said first edge being located proximal to said wrist when said platform is in use, said wrist rest comprising a resilient material.

15. The platform of claim 14 wherein said support assembly top surface further comprises:

a side edge, an end edge, and a connecting edge for connecting said side edge and said end edge, wherein said connecting edge defines with said side edge and said end edge, an indented portion for accommodating at least some of a lower trunk of the operator, wherein said connecting edge comprises a concave shape; and a substantially planar surface, wherein said support assembly permits said substantially planar surface to be stably positioned substantially parallel to a top surface of the operator's thigh while said platform is in operation.

16. The platform of claim 14 further comprising:

a storage means enabling the bottom surface of said platform to be selectively attached directly to an associated inanimate item other than the associated mouse when said platform is not in use, wherein said storage means is secured at least in part directly to said support assembly bottom surface, and wherein said storage means comprises a fastener;

a substantially closed aperture for restraining said mouse from falling to the floor, said aperture being located adjacent a second edge of said support assembly top surface and being adapted to accommodate a communications wire of said mouse; and a rail for keeping said mouse on said mousing surface, said rail being mounted on said support assembly top surface and extending around at least some of a perimeter of said support assembly top surface, wherein said aperture is located in said rail.

17. A platform for a computer mouse used with a microprocessor and an operator's extremity associated with controlling said mouse, wherein the platform is configured to stably rest upon a thigh of the operator, said platform comprising a support assembly including at least one piece and comprising:

a deck having a top surface, on which an associated mouse and the extremity can selectively rest, and a bottom surface;

a base having a top surface, and a bottom surface that is adapted to rest upon a thigh of the operator; and, wherein said base top surface comprises a pair of side edges and a pair of end edges, said four edges defining among them at least two spaced indented portions shaped to accommodate at least some of a lower trunk of the operator, wherein one of said indented portions accommodates at least some of a lower trunk adjacent to a right thigh of the operator when said platform is resting on said right thigh, and another of said indented portions accommodates at least some of a lower trunk adjacent to a left thigh of the operator when said platform is resting on the left thigh, wherein one of said side edges is located primarily inboard the operator's thigh when said platform is resting on the thigh and the other of said side edges is located primarily outboard of the thigh when said platform is resting on the thigh, and wherein said side edge resting inboard of the thigh is shorter than said side edge resting outboard of the thigh.

18. The platform of claim 17 wherein:

said deck top surface comprises a pair of side edges and a pair of end edges, said four edges defining among them at least two spaced indented portions shaped to accommodate at least some of a lower trunk of the operator, wherein one of said indented portions in said deck accommodates at least some of a lower trunk of the operator adjacent to a right thigh of the operator when said platform is resting on the right thigh, and another of said indented portions in said deck accommodates at least some of a lower trunk adjacent to a left thigh of the operator when said platform is resting on the left thigh;

said deck top surface comprises a surface that is substantially planar, wherein said support assembly is adapted for said substantially planar surface to be stably positioned substantially parallel to a top surface of the operator's thigh while said platform is in operation; and said platform comprises a guardrail for preventing said mouse from falling off said deck top surface, said guardrail extending around at least some of said deck top surface.

19. The platform of claim 17 wherein said platform further comprises:

a substantially closed aperture for controlling a communications wire of the associated mouse while said platform is in use, said aperture being located adjacent an edge of said deck top surface and being adapted to accommodate said communications wire; and wherein said base bottom surface comprises a friction element for retarding a sliding movement of said platform upon the thigh, said friction element being located on said base bottom surface.

20. A platform for a computer mouse used with a microprocessor and an operator's extremity associated with controlling said mouse, wherein the platform is configured to stably rest upon a thigh of the operator, said platform comprising a support assembly including at least one piece and comprising:

a top surface, on which an associated mouse and the extremity can be selectively supported, wherein said top surface comprises a mousing surface upon which the associated mouse may rest and be operated, said mousing surface being substantially planar and wherein said mousing surface can be stably positioned substantially parallel to a top surface of the operator's thigh when the platform is in operation; and a bottom surface that is configured to rest upon a thigh of the operator;

wherein said support assembly top surface comprises a first side edge, an end edge, and a connecting edge for connecting the first side edge and said end edge, wherein said connecting edge defines with said first side edge and said end edge, an indented portion for accommodating at least some of a lower trunk of the operator, wherein said connecting edge comprises a concave shape.

21. The platform of claim 20 further comprising:

a guardrail for keeping said mouse on said support assembly top surface, wherein said guardrail is mounted on said support assembly top surface and extends around at least some of a perimeter of said support assembly top surface.

22. The platform of claim 20 further comprising:

a storage means enabling said support assembly to be selectively attached directly to an associated inanimate item other than the associated mouse when said platform is not in use, wherein said storage means comprises a fastener secured directly to said support assembly.

23. A platform for a computer mouse used with a microprocessor and an operator's appendage associated with operating said mouse, wherein the platform is configured to stably rest upon a thigh of the operator, said platform comprising a support assembly including at least one piece and comprising:

a top surface, on which an associated mouse and the appendage can be selectively supported, wherein said top surface comprises a surface that is substantially planar;

a bottom surface, wherein said bottom surface is adapted to rest upon a thigh of the operator; and, an aperture located adjacent an edge of said top surface for accommodating a communications wire of the associated mouse.

24. The platform of claim 23 wherein said support assembly comprises:

a wrist rest for supporting an operator's wrist and adjacent areas of the operator's appendage, said wrist rest being located upon said support assembly top surface, wherein said wrist rest is located adjacent an edge of said support assembly top surface, said edge being proximal to the appendage when said platform is in use, said wrist rest comprising a resilient material.

25. The platform of claim 23 wherein:

said support assembly top surface further comprises a first side edge, an end edge and a connecting edge for connecting the first side edge to the end edge, wherein said connecting edge defines with said first side edge and said end edge, an indented portion for accommodating at least some of a lower trunk of the operator, wherein said connecting edge comprises a concave shape;

said substantially planar top surface can be stably positioned substantially parallel to a top surface of said operator's thigh when the platform is in operation; and said support assembly bottom surface comprises a friction element for retarding a sliding movement of said platform upon the thigh.

26. The platform of claim 23 further comprising:

a guardrail for keeping the associated mouse on said support assembly top surface, said guardrail being mounted on said support assembly top surface and extending around at least some of a perimeter of said support assembly top surface;

wherein said aperture is located in said guardrail and said guardrail rises above said substantially planar top surface, said aperture accommodating a side to side movement of the communications wire of the associated mouse.

* * * * *